(12) United States Patent
Agarwal et al.

(10) Patent No.: US 7,695,815 B2
(45) Date of Patent: Apr. 13, 2010

(54) LOW SMOKE POLYCARBONATE COMPOSITION AND LAMINATES, METHOD OF MANUFACTURE AND PRODUCT MADE THEREFROM

(75) Inventors: Naveen Agarwal, Evansville, IN (US); Thomas Ebeling, Forest, VA (US); Srinivas Siripurapu, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 776 days.

(21) Appl. No.: 11/317,428

(22) Filed: Dec. 22, 2005

(65) Prior Publication Data

US 2007/0048527 A1 Mar. 1, 2007

Related U.S. Application Data

(63) Continuation-in-part of application No. 11/212,424, filed on Aug. 26, 2005, now abandoned.

(51) Int. Cl.
*B32B 27/28* (2006.01)
*C08L 69/00* (2006.01)

(52) U.S. Cl. .................. 428/412; 524/127; 525/66; 525/67; 525/431; 525/433; 525/464

(58) Field of Classification Search .............. None
See application file for complete search history.

(56) References Cited

U.S. PATENT DOCUMENTS

| | | | |
|---|---|---|---|
| 3,539,657 A | 11/1970 | Noshay et al |
| 3,803,085 A | 4/1974 | Takehoshi et al |
| 3,847,867 A | 11/1974 | Heath et al |
| 3,850,885 A | 11/1974 | Takekoshi |
| 3,852,242 A | 12/1974 | White |
| 3,855,178 A | 12/1974 | White et al |
| 3,905,942 A | 9/1975 | Takekoshi et al |
| 3,972,902 A | 8/1976 | Heath et al. |
| 3,983,093 A | 9/1976 | Williams, III et al. |
| 4,154,775 A | 5/1979 | Axelrod |
| 4,387,193 A | 6/1983 | Giles, Jr. |
| 4,393,168 A | 7/1983 | Giles, Jr. et al. |
| 4,395,518 A | 7/1983 | Giles, Jr. et al. |
| 4,443,591 A | 4/1984 | Schmidt et al. |
| 4,455,410 A | 6/1984 | Giles, Jr. |
| 4,609,514 A | 9/1986 | Kyle et al. |
| 4,609,997 A | 9/1986 | Matsuyama |
| 4,629,759 A | 12/1986 | Rock |
| 4,746,701 A | 5/1988 | Kress et al. |
| 4,808,686 A | 2/1989 | Cella et al. |
| 4,814,380 A | 3/1989 | Liu |
| 4,816,527 A | 3/1989 | Rock |
| 4,855,356 A | 8/1989 | Holub et al. |
| 4,957,805 A | 9/1990 | Biggs et al. |
| 4,964,935 A | 10/1990 | Biggs et al. |
| 5,051,483 A | 9/1991 | Rock et al. |
| 5,248,732 A | 9/1993 | Drzewinski |
| 5,280,085 A | 1/1994 | Rock et al. |
| 5,380,795 A | 1/1995 | Gosens et al. |
| 5,558,931 A | 9/1996 | Biggs et al. |
| 5,608,027 A | 3/1997 | Crosby et al. |
| 5,609,966 A | 3/1997 | Perrin et al. |
| 5,639,324 A | 6/1997 | Biggs et al. |
| 5,986,016 A | 11/1999 | Puyenbroek et al. |
| 6,072,010 A | 6/2000 | Puyenbroek |
| 6,221,940 B1 | 4/2001 | Puyenbroek et al. |
| 6,310,145 B1 | 10/2001 | Puyenbroek et al. |
| 6,524,420 B1 | 2/2003 | Bristow et al. |
| 2002/0123566 A1 | 9/2002 | Georgiev et al. |
| 2003/0105226 A1* | 6/2003 | Cella et al. ................. 525/67 |
| 2003/0175488 A1 | 9/2003 | Asthana et al. |
| 2004/0197547 A1 | 10/2004 | Bristow et al. |
| 2004/0220330 A1 | 11/2004 | DeRudder et al. |
| 2005/0082881 A1 | 4/2005 | Bristow et al. |
| 2005/0112331 A1 | 5/2005 | Donea et al. |
| 2005/0182165 A1 | 8/2005 | Ma et al. |
| 2007/0049706 A1* | 3/2007 | Siripurapu et al. .......... 525/464 |

FOREIGN PATENT DOCUMENTS

| | | |
|---|---|---|
| EP | 0 683 200 B1 | 11/1995 |
| EP | 0 905 193 A2 | 3/1999 |
| EP | 0 692 522 B1 | 9/2002 |
| WO | WO 2004/076541 A2 | 9/2004 |
| WO | 2005037921 A1 | 4/2005 |
| WO | 2005075549 A1 | 8/2005 |
| WO | 2005075568 A2 | 8/2005 |

OTHER PUBLICATIONS

International Application No. PCT/US2006/030619; International Search Report dated Nov. 28, 2006.

(Continued)

*Primary Examiner*—David Buttner
(74) *Attorney, Agent, or Firm*—Cantor Colburn LLP

(57) ABSTRACT

A laminate contains a first layer and a second layer. The first layer contains a first composition that contains polycarbonate, polycarbonate-polysiloxane copolymer, impact modifier and polyetherimide, wherein the polycarbonate constitutes at least about 50% by weight of the composition and a 3.2 millimeter thick, 7.6 centimeter square sample of the first composition produces a smoke density (Ds) of less than 275 after a 4-minute burn, measured according to ASTM E 662-03. The first composition may contain about 50 wt. % to about 97 wt. % polycarbonate, about 0.5 wt. % to about 25 wt. % polycarbonate-polysiloxane copolymer, about 0.5 wt. % to about 20 wt. % impact modifier, and about 2 wt. % to about 15 wt. % polyetherimide, by weight. An article may contain a sheet or film made from such a composition. A laminate or article may be made to include a first layer or sheet that includes such a composition.

17 Claims, 4 Drawing Sheets

OTHER PUBLICATIONS

UL 94; "Tests for Flammability of Plastic Materials for Parts in Devices and Appliances"; Underwriters Laboratories, Inc.; Fifth Edition, dated Oct. 29, 1996; ISBN 0-762809982-2.

Standard Test Methods of Determining the Izod Pendulum Impact Resistance of Plastics; D 256-04; Copyright by ASTM International.

Standard Test Method for Specular Gloss; D 523-89; Copyright ASTM.

Standard Test Method for Tensile Properties of Plastics; D 638-03; Copyright ASMT International.

Standard Test method for Deflection Temperature of Plastics Under Flexural Load in the Edgewise Position; D 648-01; Copyright ASTM.

Standard Test Method for Specific Optical Density of Smoke Generated by Solid Materials; E 662-03; Copyright ASTM International.

Standard Test Method for Heat and Visible Smoke Release Rates for Materials and Products; E 906-04; Copyright ASTM International.

Standard Test Method for Melt Flow Rates of Thermoplastics by Extrusion Plastometer; D 1238-01; Copyright ASTM.

Standard Test Method for High Speed Puncture Properties of Plastics Using Load and Displacement Sensors; D 3763-02; Copyright ASTM International.

International Standard; "Plastics—Determination of Izod Impact Strength"; third edition Dec. 15, 2000; Reference No. ISO 180:2000(E).

EP 0 905 193; Mar. 31, 1999; Weber et al; English Abstract; only 1 page.

* cited by examiner

LOW SMOKE POLYCARBONATE COMPOSITION AND LAMINATES, METHOD OF MANUFACTURE AND PRODUCT MADE THEREFROM

CROSS REFERENCE TO RELATED APPLICATION

This application is a continuation-in-part of U.S. patent application Ser. No. 11/212,424 filed Aug. 26, 2005, now abandoned which is incorporated herein by reference in its entirety.

BACKGROUND OF THE INVENTION

This disclosure relates to polycarbonate compositions, and in particular to polycarbonate compositions that include impact modifier compositions, their use in laminated articles, methods of manufacture, and uses thereof. Blends of polycarbonate with impact modifier compositions are useful in many engineering applications because they exhibit a balance of moldability, heat resistance, moisture resistance, impact strength and good flame retardance ratings. For example, polycarbonate/acrylonitrile-butadiene-styrene blends are used to manufacture housings for desktop and laptop computers, cell phones, computer printers, etc. However, when they burn, these blends generate too much smoke for them to be useful in transportation and construction applications such as train, bus, or aircraft interior and exterior parts, for which stringent low smoke generation requirements are imposed for passenger safety. Similarly, in building interiors, there is a strict requirement on the amount of smoke that can be generated from plastic parts to ensure human safety in the event of a fire. For this reason, polyimides, polyaramides such as Kevlar® and polyetherimides are extensively used in aircraft interiors, high temperature automotive lighting bezels, under the hood automotive applications, etc. However these polymers are very expensive and difficult to process and do not provide the mechanical properties exhibited by polycarbonate compositions. For example, polyetherimides generally have poor impact strength and flow properties relative to polycarbonates.

U.S. Pat. No. 5,986,016 discloses polyetherimide resin compositions with improved low temperature ductility comprising polyetherimide; siloxane-polyetherimide copolymer; up to 35 wt. % polycarbonate and/or copolyester-carbonate; and glycidyl ester and/or polycarbonate-polysiloxane copolymer impact modifier.

There remains a need in the art for polycarbonate resin compositions that include impact modifiers but that do not produce excessive smoke upon being burned and that exhibit good processability and good mechanical properties.

SUMMARY OF THE INVENTION

A laminate comprises a first layer and a second layer, wherein the first layer comprises a first thermoplastic composition comprising a polycarbonate, a polycarbonate-polysiloxane copolymer, an impact modifier, and a polyetherimide, wherein the polycarbonate comprises greater than or equal to about 50% by weight of the combined weights of the polycarbonate, polycarbonate-polysiloxane copolymer, impact modifier and polyetherimide in the first thermoplastic composition; and wherein a 3.2 millimeter thick, 7.6 centimeter square sample of the first thermoplastic composition produces a smoke density (Ds) of less than 275 after a 4-minute burn, measured according to ASTM E 662-03.

In another embodiment, a laminate comprises a first layer and a second layer, wherein the first layer comprises a first thermoplastic composition comprising about 50 wt. % to about 97 wt. % polycarbonate, about 0.5 wt. % to about 25 wt. % polycarbonate-polysiloxane copolymer, about 0.5 wt. % to about 20 wt. % impact modifier, and about 2 wt. % to about 15 wt. % polyetherimide, by weight of the first thermoplastic composition.

In another embodiment, an article comprises a first sheet or film, wherein the first sheet or film comprises a first thermoplastic composition comprising about 50 wt. % to about 97 wt. % polycarbonate, about 0.5 wt. % to about 25 wt. % polycarbonate-polysiloxane copolymer, about 0.5 wt. % to about 20 wt. % impact modifier, and about 2 wt. % to about 15 wt. % polyetherimide, by weight of the first thermoplastic composition.

A method for forming a laminate comprises co-injecting molding, co-extrusion lamination, co-extrusion blow film molding, co-extrusion, overmolding, multi-shot injection molding, or sheet molding a plurality of layers comprising a first layer that comprises a first thermoplastic composition as described herein.

In yet another embodiment, an article comprises a film or sheet, wherein the film or sheet comprises a thermoplastic composition comprising a polycarbonate, a polycarbonate-polysiloxane copolymer, an impact modifier, and a polyetherimide, wherein the polycarbonate comprises greater than or equal to about 50% by weight of the combined weights of the polycarbonate, polycarbonate-polysiloxane copolymer, impact modifier and polyetherimide in the thermoplastic composition, and wherein a 3.2 millimeter thick, 7.6 centimeter square sample of the thermoplastic composition produces a smoke density (Ds) of less than 275 after a 4-minute burn, measured according to ASTM E 662-03.

The above-described and other features are exemplified by the following detailed description.

DETAILED DESCRIPTION OF THE INVENTION

Figure 1:
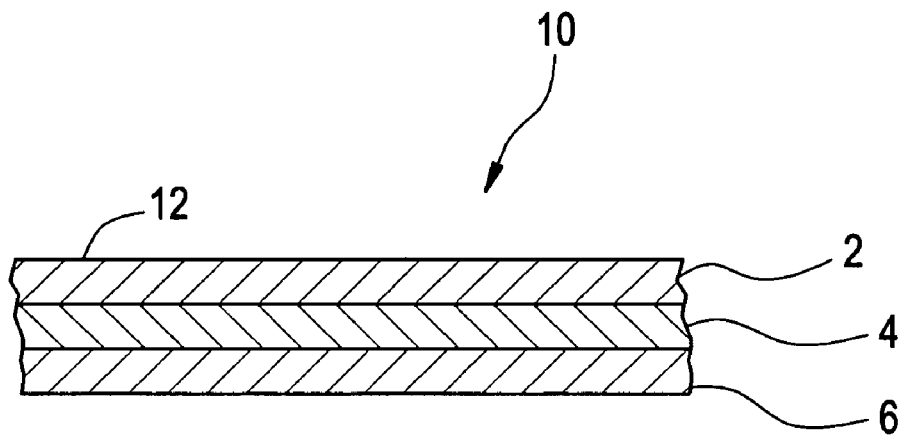
FIG. 1 is a cross-sectional view of one embodiment of the disclosed laminate.

The thermoplastic compositions disclosed herein comprise polycarbonate, polycarbonate-polysiloxane copolymer, polyetherimide and an impact modifier and exhibit a combination of properties such as low smoke generation upon burning, impact resistance, flame retardance, etc., not previously attained in materials comprising those components. Also disclosed are laminates comprising such compositions.

As used herein, the terms "polycarbonate" and "polycarbonate resin" mean compositions having repeating structural carbonate units of the formula (1):

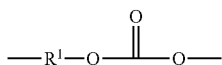

(1)

in which at least about 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

$$-A^1-Y^1-A^2-$$  (2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes dihydroxy compounds of formula (3)

$$HO-A^1-Y^1-A^2-OH$$  (3)

wherein $Y^1$, $A^1$ and $A^2$ are as described above. Also included are bisphenol compounds of general formula (4):

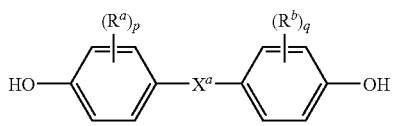

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

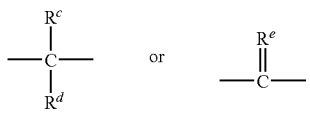

(5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxy phenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane. Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents may be added at a level of about 0.05 to 2.0 wt. %. All types of polycarbonate end groups are contemplated as being useful in the polycarbonate composition, provided that such end groups do not significantly affect desired properties of the thermoplastic compositions.

"Polycarbonates" and "polycarbonate resins" as used herein further include blends of polycarbonates with other copolymers comprising carbonate chain units. A specific suitable copolymer is a polyester carbonate, also known as a copolyester-polycarbonate. Such copolymers further contain, in addition to recurring carbonate chain units of the formula (1), repeating units of formula (6)

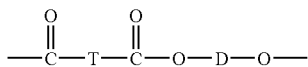 (6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

 (7)

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalene-dicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In one specific embodiment, the polycarbonate is a linear homopolymer derived from bisphenol A, in which each of $A^1$ and $A^2$ is p-phenylene and $Y^1$ is isopropylidene. The polycarbonate may have an intrinsic viscosity, as determined in chloroform at 25° C., of about 0.3 to about 1.5 deciliters per gram (dl/gm), specifically about 0.45 to about 1.0 dl/gm. The polycarbonate may have a weight average molecular weight of about 10,000 to about 200,000, specifically about 20,000 to about 100,000 as measured by gel permeation chromatography.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-188}$ aryloxy group. An effective amount of a phase transfer catalyst may be about 0.1 to about 10 wt. % based on the weight of bisphenol in the phosgenation mixture. In another embodiment an effective amount of phase transfer catalyst may be about 0.5 to about 2 wt. % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

The copolyester-polycarbonate resins may also be prepared by interfacial polymerization. Rather than utilizing the dicarboxylic acid per se, it is possible to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

In addition to the polycarbonates described above, it is also possible to use combinations of the polycarbonate with other thermoplastic polymers, for example combinations of polycarbonates and/or polycarbonate copolymers with polyesters. As used herein, a "combination" is inclusive of all mixtures, blends, alloys, and the like. Suitable polyesters comprise repeating units of formula (6), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid, has been incorporated. Furthermore, it is sometime desirable to have various concentrations of acid and hydroxyl end groups on the polyester, depending on the ultimate end use of the composition.

In one embodiment, poly(alkylene terephthalates) are used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from about 0.5 to about 10 percent by weight, of units derived from an aliphatic diacid and/or an aliphatic polyol to make copolyesters.

The blends of a polycarbonate and a polyester may comprise about 1 to about 99 wt. % polycarbonate and correspondingly about 99 to about 1 wt. % polyester, in particular a poly(alkylene terephthalate). In one embodiment, the blend comprises about 30 to about 70 wt. % polycarbonate and correspondingly about 70 to about 30 wt. % polyester. The foregoing amounts are base on the total weight of the polycarbonate resin and polyester resin.

The composition further comprises a polycarbonate-polysiloxane copolymer. The polysiloxane blocks of the copolymer comprise repeating polydiorganosiloxane units of formula (8):

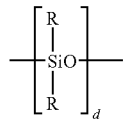

(8)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. The foregoing groups may be fully or partially halogenated with fluorine, chlorine, bromine, or iodine, or a combination thereof. Combinations of the foregoing R groups may be used in the same copolymer.

The value of d in formula (8) may vary widely depending on the type and relative amount of each component in the thermoplastic composition, the desired properties of the composition, and like considerations. Generally, d may have an average value of 2 to about 1,000, specifically about 2 to about 500, more specifically about 5 to about 100. In one embodiment, d has an average value of about 10 to about 75, and in still another embodiment, d has an average value of about 40 to about 60. Where d is of a lower value, e.g., less than about 40, it may be desirable to use a relatively larger amount of the polycarbonate-polysiloxane copolymer. Conversely, where d is of a higher value, e.g., greater than about 40, it may be necessary to use a relatively lower amount of the polycarbonate-polysiloxane copolymer.

A combination of a first and a second (or more) polycarbonate-polysiloxane copolymers may be used, wherein the average value of d of the first copolymer is less than the average value of d of the second copolymer.

In one embodiment, the polydiorganosiloxane blocks are provided by repeating structural units of formula (9):

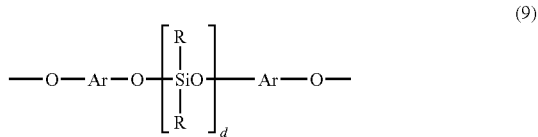

(9)

wherein d is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (9) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarlyene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulphide), and 1,1-bis(4-hydroxy-t-butylphenyl) propane. Combinations comprising at least one of the foregoing dihydroxy compounds may also be used.

Such units may be derived from the corresponding dihydroxy compound of formula (10):

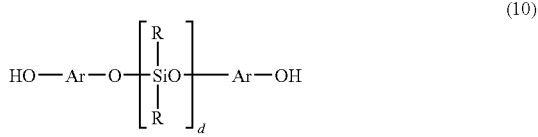

(10)

wherein Ar and d are as described above. Such compounds are further described in U.S. Pat. No. 4,746,701 to Kress et al. Compounds of formula (10) may be obtained by the reaction of a dihydroxyarylene compound with, for example, an alpha, omega-bisacetoxypolydiorangonosiloxane under phase transfer conditions.

In another embodiment, polydiorganosiloxane blocks comprises units of formula (11):

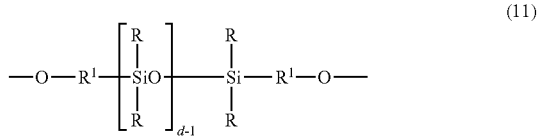

(11)

wherein R is as described above, d-1 is 1 to 1000, each occurrence of $R^1$ is independently a divalent $C_1$-$C_{30}$ hydrocarbylene, and wherein the polymerized polysiloxane unit is the reaction residue of its corresponding dihydroxy compound. In a specific embodiment, the polydiorganosiloxane blocks are provided by repeating structural units of formula (12):

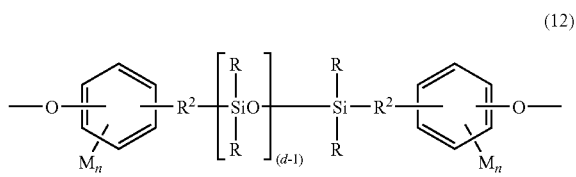

(12)

wherein R and d are as defined above. $R^2$ in formula (12) is a divalent $C_2$-$C_8$ aliphatic group. Each M in formula (12) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

Units of formula (12) may be derived from the corresponding dihydroxy polydiorganosiloxane (13):

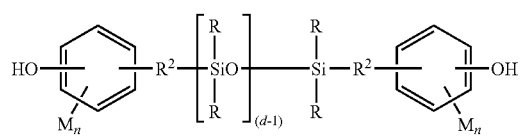

(13)

wherein R, d, M, $R^2$, and n are as described above. Such dihydroxy polysiloxanes can be made by effecting a platinum catalyzed addition between a siloxane hydride of formula (14):

(14)

wherein R and d are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The thermoplastic composition further includes one or more impact modifier compositions, to improve its impact resistance. Suitable impact modifiers include elastomer-modified graft copolymers comprising (i) an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Suitable conjugated diene monomers for preparing the elastomer phase are of formula (15):

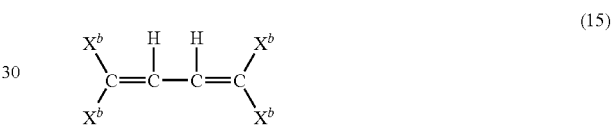

(15)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (16):

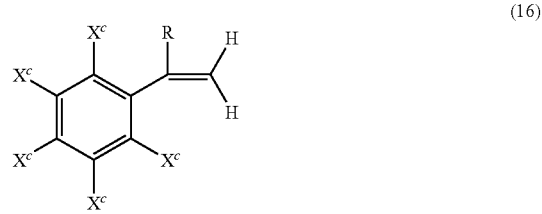

(16)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (17):

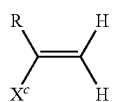

(17)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (17) include acrylonitrile, ethacrylonitrile, methacrylonitrile, alpha-chloroacrylonitrile, beta-chloroacrylonitrile, alpha-bromoacrylonitrile, acrylic acid, methyl (meth) acrylate, ethyl (meth)acrylate, n-butyl (meth)acrylate, t-butyl (meth)acrylate, n-propyl (meth)acrylate, isopropyl (meth) acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl (meth)acrylates, in particular $C_4$-6 alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 wt. % of comonomers of formulas (15), (16) or (17). Exemplary comonomers include but are not limited to butadiene, isoprene, styrene, methyl methacrylate, phenyl methacrylate, penethylmethacrylate, N-cyclohexylacrylamide, vinyl methyl ether or acrylonitrile, and mixtures comprising at least one of the foregoing comonomers. Optionally, up to 5 wt. % of a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and may have a gel content greater than 70%. Also suitable are mixtures of butadiene with styrene and/or $C_{4-6}$ alkyl acrylate rubbers.

The elastomeric phase may provide about 5 to about 95 wt. % of the total graft copolymer, more specifically about 20 to about 90 wt. %, and even more specifically about 40 to about 85 wt. % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (16) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (17). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include acrylonitrile, ethacrylonitrile, methacrylonitrile, methyl (meth)acrylate, ethyl (meth)acrylate, n-propyl (meth)acrylate, isopropyl (meth)acrylate, and the like, and combinations comprising at least one of the foregoing comonomers.

The relative ratio of monovinyl aromatic monomer and comonomer in the rigid graft phase may vary widely depending on the type of elastomer substrate, type of monovinyl aromatic monomer(s), type of comonomer(s), and the desired properties of the impact modifier. The rigid phase may generally comprise up to 100 wt. % of monovinyl aromatic monomer, specifically about 30 to about 100 wt. %, more specifically about 50 to about 90 wt. % monovinyl aromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise about 40 to about 95 wt. % elastomer-modified graft copolymer and about 5 to about 65 wt. % graft (co)polymer, based on the total weight of the impact modifier. In another embodiment, such impact modifiers comprise about 50 to about 85 wt. %, more specifically about 75 to about 85 wt. % rubber-modified graft copolymer, together with about 15 to about 50 wt. %, more specifically about 15 to about 25 wt. % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^d)C(O)OCH_2CH_2R^e$, wherein $R^d$ is hydrogen or a $C_1$-$C_8$ linear or branched hydrocarbyl group and $R^e$ is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane., octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (16) or (17), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate may be reacted with a first graft link monomer such as (gamma-methaacryloxypropyl)methyldimethoxysilane, to afford silicone rubber having an average particle size from about 100 nanometers to about 2 microns. At least one branched acrylate rubber monomer is then polymerized with the silicone rubber particles, optionally in the presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

In one embodiment the foregoing types of impact modifiers are prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. This emulsion polymerization process is described and disclosed in various patents and literature of such companies as Rohm & Haas and General Electric Company.

A specific impact modifier of this type is a methyl methacrylate-butadiene-styrene (MBS) impact modifier wherein the butadiene substrate is prepared using above-described sulfonates, sulfates, or phosphates as surfactants. Other examples of elastomer-modified graft copolymers besides ABS and MBS include but are not limited to acrylonitrile-styrene-butyl acrylate (ASA), methyl methacrylate-acrylonitrile-butadiene-styrene (MABS), and acrylonitrile-ethylene-propylene-diene-styrene (AES).

Polyimides have the general Formula (18):

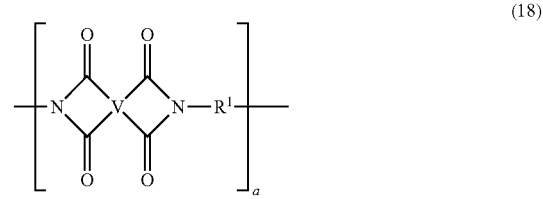

wherein a is more than 1, typically about 10 to about 1,000 or more, and can specifically be about 10 to about 500; and wherein V is a tetravalent linker without limitation, as long as the linker does not impede synthesis or use of the polyimide. Suitable linkers include, but are not limited to: (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms; and combinations comprising at least one of the foregoing linkers. Suitable substitutions and/or linkers include, but are not limited to, ethers, epoxides, amides, esters, and combinations comprising at least one of the foregoing. Exemplary linkers include, but are not limited to, tetravalent aromatic radicals of Formula (19), such as:

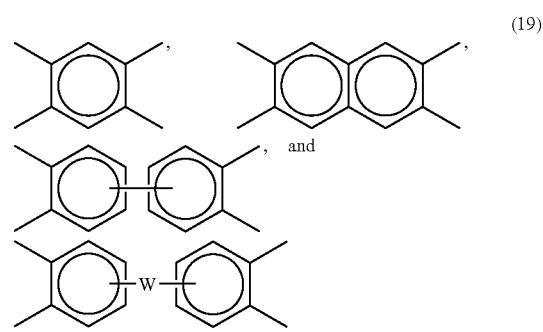

wherein W is a divalent moiety such as —O—, —S—, —C(O)—, —SO$_2$—, —SO—, —C$_y$H$_{2y}$— (y being an integer of 1 to 5), and halogenated derivatives thereof, including perfluoroalkylene groups, or a group of the Formula —O—Z—O— wherein the divalent bonds of the —O— or the —O—Z—O— group are in the 3,3', 3,4', 4,3', or the 4,4' positions, and wherein Z includes, but is not limited to, divalent radicals of Formula (20):

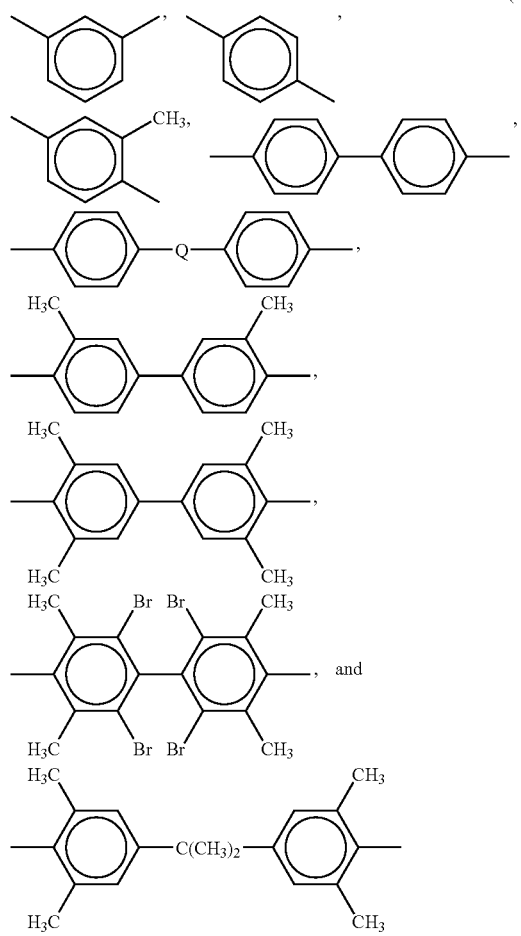

(20)

wherein Q includes, but is not limited to, a divalent moiety comprising —O—, —S—, —C(O)—, —SO$_2$—, —SO—, —C$_y$H$_{2y}$— (y being an integer from 1 to 5), and halogenated derivatives thereof, including perfluoroalkylene groups.

R$^1$ in formula (18) includes but is not limited to substituted or unsubstituted divalent organic radicals such as: aromatic hydrocarbon radicals having about 6 to about 20 carbon atoms and halogenated derivatives thereof; straight or branched chain alkylene radicals having about 2 to about 20 carbon atoms; cycloalkylene radicals having about 3 to about 20 carbon atoms; or divalent radicals of the general formula (21):

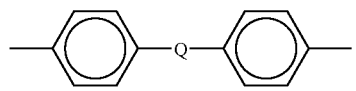

(21)

wherein Q is defined as above.

Exemplary classes of polyimides include, but are not limited to, polyamidimides and polyetherimides, particularly those polyetherimides that are melt processable, such as those whose preparation and properties are described in U.S. Pat. Nos. 3,803,085 and 3,905,942.

Polyetherimide resins comprise more than 1, typically about 10 to about 1,000 or more, and more specifically about 10 to about 500 structural units, of the Formula (22):

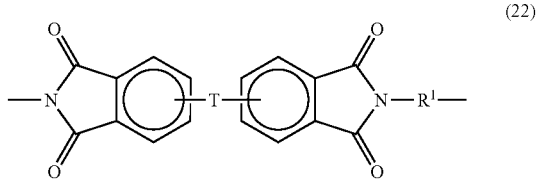

(22)

wherein T is —O— or a group of the Formula —O—Z—O— wherein the divalent bonds of the —O— or the —O—Z—O— group are in the 3,3', 3,4', 4,3', or the 4,4' positions, and wherein Z and R$^1$ are defined as described above.

In one embodiment, the polyetherimide may be a copolymer (e.g., the polyetherimide siloxane) which, in addition to the etherimide units described above, further contains polyimide structural units of the Formula (23):

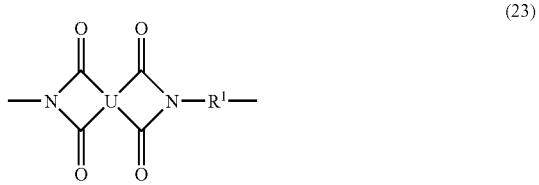

(23)

wherein R$^1$ is as previously defined and U includes, but is not limited to, radicals of Formula (24):

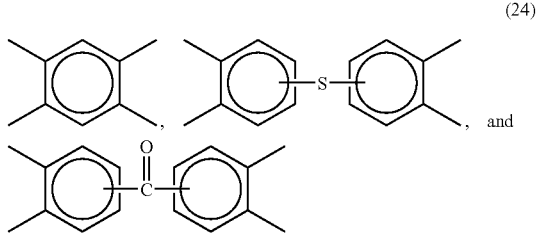

(24)

The polyetherimide can be prepared by any of a variety of methods, including the reaction of an aromatic bis(ether anhydride) of the Formula (25):

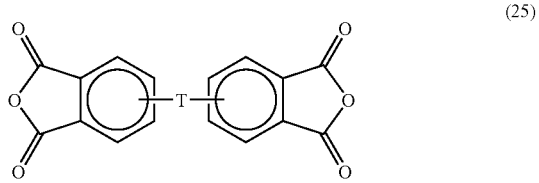

(25)

with an organic diamine of the Formula (26):

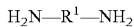 (26)

wherein $R^1$ and T are defined in relation to Formulas (18) and (22), respectively.

The polyetherimide siloxane copolymer employed contains repeating groups of the Formulas (27a and 27b):

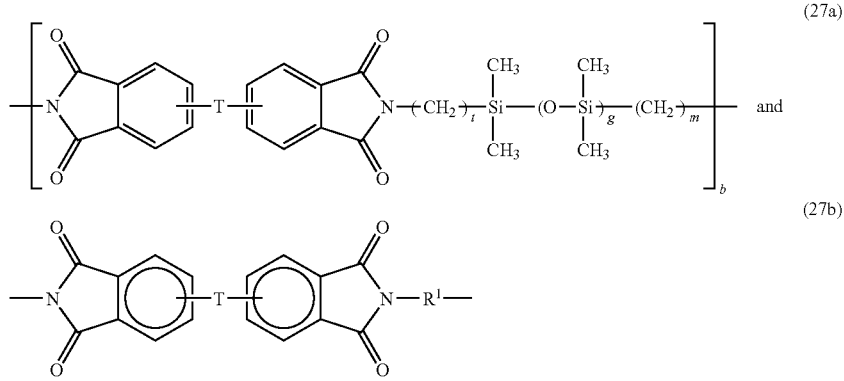

wherein "b" in formula (27a) is an integer greater than 1, preferably 10 to 10,000 or more; T is described above in relation to Formula (22); $R^1$ is described above in relation to Formula (18); t and m independently are integers from 1 to about 10; and g is an integer from 1 to about 40.

The polyetherimide siloxane copolymer can similarly be prepared by various methods, including the reaction of an aromatic bis(ether anhydride) of Formula (25) with two or more organic diamines of Formula (26) and Formula (28):

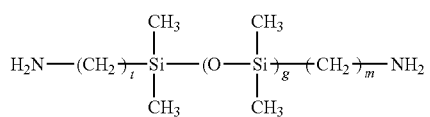 (28)

where t, m, and g, are defined as described above in relation to Formulas (27a) and (27b).

The two organic diamines, including a diamine of Formula (26) and the amine-terminated organosiloxane of Formula (28), may be physically mixed prior to reaction with the bis(ether anhydride)(s), thus forming a substantially random copolymer. Alternatively, block or alternating copolymers may be formed by forming prepolymers or sequential addition of reactants.

In one embodiment, the amine-terminated organosiloxanes are those of the Formula (28), in which t and m are independently 1 to about 5, and g is about 5 to about 25. In another embodiment the amine-terminated organosiloxanes are those in which t and m are each 3, and which have a molecular weight distribution such that g has an average value of about 9 to about 20.

The polyimides of Formula (18) and the polyetherimides of Formula (22) may be copolymerized with other polymers such as polysiloxanes, polyesters, polycarbonates, polyacrylates, fluoropolymers, and the like. Preferred among these are polysiloxanes of the formula (29):

 (29)

where $R^2$ is the same or different $C_{(1-14)}$ monovalent hydrocarbon radical or $C_{(1-14)}$ monovalent hydrocarbon radical substituted with radicals inert during polycondensation or displacement reactions. The integer h can be about 1 to about 200. The reactive end group $R^3$ may be any functionality capable of reacting with the reactive endgroups on the polyimide of Formula (18) or the polyetherimide of Formula (22). Numerous reactive end groups are known, and include, for example, halogen atoms; lower dialkylamino groups of 2 to about 20 carbon atoms; lower acyl groups of 2 to about 20 carbon atoms; lower alkoxy groups of 2 to about 20 carbon atoms; and hydrogen. U.S. Pat. No. 3,539,657 to Noshay et al. discloses certain siloxane-polyarylene polyether block copolymers, and describes, in general and specific terms, numerous siloxane oligomers having reactive end groups. In one embodiment, the siloxane oligomers can be those in which $R^3$ comprises a primary amino group, an acetyl group or a chlorine atom.

The diamine component of the polyetherimide siloxane copolymers generally contains about 10 mole percent (mole %) to about 50 mole % of the amine-terminated organosiloxane of Formula (28) and about 50 to about 90 mole % of the organic diamine of Formula (26). Specifically, the diamine component can contain about 25 mole % to about 40 mole %, more specifically about 35 mole % of the amine-terminated organosiloxane, based upon the total mole % of the copolymer. Examples of polyetherimide siloxanes can be found, for example, in U.S. Pat. Nos. 4,609,997, 4,808,686, and 5,280,085.

Examples of specific aromatic bis(ether anhydride)s and organic diamines are disclosed, for example, in U.S. Pat. Nos. 3,972,902 and 4,455,410. Illustrative examples of aromatic bis(ether anhydride)s of Formula (25) include: 2,2-bis[4-(3,4-dicarboxyphenoxy)phenyl]propane dianhydride ("BPA-DA"); 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl] propane dianhydride; 4,4'-bis(2,3-dicarboxyphenoxy)diphenyl ether dianhydride; 4,4'-bis(2,3-dicarboxyphenoxy) diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as mixtures comprising at least two of the foregoing.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. A preferred class of aromatic bis(ether anhydride)s included by Formula (25) above includes, but is not limited to, compounds wherein T is of the Formula (30):

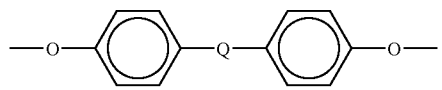

(30)

and the ether linkages, for example, can be in the 3,3', 3,4', 4,3', or 4,4' positions, and mixtures comprising at least one of the foregoing, and where Q is as defined above.

Any diamino compound may be employed. Examples of suitable compounds are ethylenediamine, propylenediamine, trimethylenediamine, diethylenetriamine, triethylenetetramine, hexamethylenedi amine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl) toluene, bis (p-b-amino-t-butylphenyl) ether, bis(p-b-methyl-o-aminophenyl) benzene, bis(p-b-methyl-o-aminopentyl) benzene, 1,3-diamino-4-isopropylbenzene, bis(4-aminophenyl) sulfide, bis (4-aminophenyl) sulfone, bis(4-aminophenyl) ether and 1,3-bis(3-aminopropyl) tetramethyldisiloxane. Mixtures comprising at least one of these compounds may also be present. The diamino compounds can, specifically, be aromatic diamines, especially m- and p-phenylenediamine and mixtures comprising at least one of these compounds.

The polyetherimide resin can comprise structural units according to Formula (22) wherein each $R^1$ is independently p-phenylene or m-phenylene or a mixture thereof and T is a divalent radical of the Formula (31):

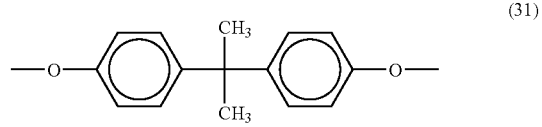

(31)

Included among the many methods of making the polyimides, particularly polyetherimides, are those disclosed in U.S. Pat. Nos. 3,847,867, 3,850,885, 3,852,242, 3,855,178, 3,983,093, and 4,443,591.

In general, the reactions can be carried out employing various solvents, e.g., o-dichlorobenzene, m-cresol/toluene, and the like, to effect a reaction between the anhydride of Formula (25) and the diamine of Formula (26), at temperatures of about 100° C. to about 250° C. Alternatively, the polyetherimide can be prepared by melt polymerization or interfacial polymerization, e.g., melt polymerization of aromatic bis(ether anhydride)s (25) and diamines (26) and optionally (28) by heating a mixture of the starting materials to elevated temperatures with concurrent stirring. Generally, melt polymerizations employ temperatures of about 200° C. to about 400° C. Chain stoppers and branching agents may also be employed in the reaction. When polyetherimide/polyimide copolymers are employed, a dianhydride, such as pyromellitic anhydride, is used in combination with the bis (ether anhydride). The polyetherimide resins can optionally be prepared from reaction of an aromatic bis(ether anhydride) with an organic diamine in which the diamine is present in the reaction mixture at less than or equal about 0.2 molar excess, and preferably less than about 0.2 molar excess. Under such conditions the polyetherimide resin has less than about 15 microequivalents per gram (µeq/g) acid titratable groups, and preferably less than about 10 µeq/g acid titratable groups, as shown by titration with chloroform solution with a solution of 33 weight percent (wt. %) hydrobromic acid in glacial acetic acid. Acid-titratable groups are essentially due to amine endgroups in the polyetherimide resin.

Generally, useful polyetherimides have a melt index of about 0.1 to about 10 grams per minute (g/min), as measured by American Society for Testing Materials (ASTM) D1238-04c (procedure B) at 295° C., using a 6.6-kilogram (kg) weight. The polyetherimide resin can have a weight average molecular weight (Mw) of about 10,000 to about 150,000 grams per mole (g/mole), optionally, a Mw of about 10,000 g/mole to about 75,000 g/mole; for example, about 10,000 g/mole to about 65,000 g/mole or, in a specific embodiment, about 10,000 g/mole to about 55,000 g/mole, as measured by gel permeation chromatography, using a polystyrene standard. Such polyetherimide resins typically have an intrinsic viscosity greater than about 0.2 deciliters per gram (dl/g), preferably about 0.35 to about 0.7 dl/g measured in m-cresol at 25° C. Some such polyetherimides include, but are not limited to, ULTEM® 1000 (number average molecular weight (Mn) 21,000 g/mole; Mw 54,000 g/mole; dispersity 2.5), ULTEM® 1010 (Mn 19,000 g/mole; Mw 47,000 g/mole; dispersity 2.5), ULTEM® 1040 (Mn 12,000 g/mole; Mw 34,000-35,000 g/mole; dispersity 2.9) (all commercially available from GE Plastics), or mixtures comprising at least one of the foregoing.

In various embodiments, the thermoplastic composition may comprise about 50 to about 97 wt. % polycarbonate resin; optionally about 60 to about 85 wt. % polycarbonate resin or, in some cases, about 70 to about 80 wt. % polycarbonate resin.

The composition may comprise about 0.5 to about 25 wt. % polycarbonate-polysiloxane copolymer; optionally about 1 to about 20 wt. % polycarbonate-polysiloxane copolymer or, in some cases, about 2 to about 15 wt. % polycarbonate-polysiloxane copolymer.

The composition may comprise about 2 to about 15 wt. % polyetherimide; optionally about 1 to about 12 wt. % polyetherimide or, in some cases, about 5 to about 10 wt. % polyetherimide.

The composition may comprise about 0.5 to about 20 wt. % impact modifier or, in some cases, about 1 to about 10 wt. % impact modifier.

The foregoing wt. % figures are all based on the total weight of polycarbonate resin, polycarbonate-polysiloxane copolymer, polyetherimide, impact modifier and optional organic phosphorus containing flame retarding agent in the composition.

The polycarbonate compositions described herein may optionally contain a smoke suppression agent. Such smoke suppression agents are known in the art to include molybdenum oxides, including $MoO_3$, ammonium octamolybdate (AOM), calcium and zinc molybdates; iron, copper, manganese, cobalt or vanadyl phthalocyanines, which may be used as a synergist with octabromobiphenyl; ferrocenes (organometallic iron), which may be used in combination with Cl paraffin and/or antimony oxide; hydrated Iron (III) oxide; hydrated zinc borates; zinc stannate and zinc hydroxy stannate; hydrates, carbonates and borates; alumina trihydrate (ATH); magnesium hydroxide; metal halides of iron, zinc, titanium, copper, nickel, cobalt, tin, aluminum, antimony and cadmium, which are non-hydrous and non-ionic, and which may be used with complexing agents such as quaternary ammonium compounds, quaternary phosphonium compounds, tertiary sulfonium compounds, organic orthosilicates, the partially hydrolyzed derivatives of organic orthosilicates, or a combination including one or more of them; nitrogen compounds, including ammonium polyphosphates (monammonium phosphate, diammonium phosphate, and the like); and FeOOH. Such smoke suppression agents may be used singly or in combination, optionally in amounts of about 0.1 to about 20 wt. % of the composition or by weight of the polymer resins in the composition or, in some cases, about 1 to about 5 wt. % by weight of the composition or by weight of the polymer resins. In some embodiments, a smoke suppression agent may be used to the exclusion of a polyetherimide.

Suitable flame retardants that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds. One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

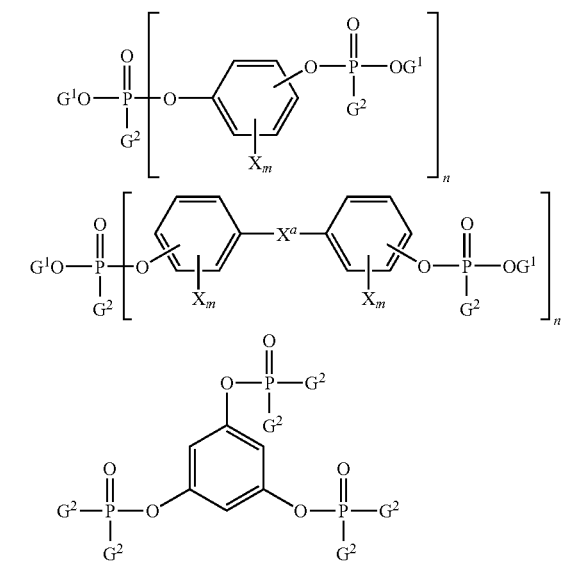

wherein each $G^1$ is independently a hydrocarbon having 1 to about 30 carbon atoms; each $G^2$ is independently a hydrocarbon or hydrocarbonoxy having 1 to about 30 carbon atoms; each $X^a$ is as defined above; each X is independently a bromine or chlorine; m is 0 to 4, and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. When present, phosphorus-containing flame retardants are generally present in amounts up to about 10 parts by weight, for example, about 0.5 to about 10 parts by weight, more specifically about 1 to about 7.5 parts by weight, optionally more specifically about 2 to about 5 parts by weight based on 100 parts of the combined weight of polycarbonate resin polycarbonate-polysiloxane copolymer, polyetherimide, organic phosphorus containing flame retarding agent and impact modifier in the composition.

Halogenated materials may also be used as flame retardants, for example halogenated compounds and resins of formula (32):

(32)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (32) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, and the like, said substituents being essentially inert provided that there is at least one and optionally two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2-bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants are generally present in amounts of about 0.01 to about 25 parts by weight, more specifically about 1 to about 10 parts by weight, based on 100 parts by weight of polycarbonate, polycarbonate-polysiloxane copolymer, polyetherimide, and impact modifier in the composition.

Inorganic flame retardants may also be used, for example salts of $C_{2-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or a fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of about 0.01 to about 25 parts by weight, more specifically about 1 to about 10 parts by weight, based on 100 parts by weight of polycarbonate resin, polycarbonate-polysiloxane copolymer, polyetherimide and impact modifier.

In addition to the polycarbonate resin, the polycarbonate-polysiloxane copolymer, polyetherimide, impact modifier, and optional flame retarding agent(s), the thermoplastic composition may include various additives ordinarily incorporated in resin compositions of this type, with the proviso that the additives are preferably selected so as to not significantly adversely affect the desired properties of the thermoplastic composition. Mixtures of additives may be used. Such additives may be mixed at a suitable time during the mixing of the components for forming the composition.

Suitable fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of about 1 to about 20 parts by weight, based on 100 parts by weight of the total composition.

Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of paracresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 0.5 parts by weight, based on 100 parts by weight of the total composition, excluding any filler.

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 0.01 to about 0.5 parts by weight, based on 100 parts by weight of the total composition, excluding any filler.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.1 to about 1 parts by weight, based on 100 parts by weight of the total composition, excluding any filler.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis (4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 to about 1 parts by weight, based on 100 parts by weight of the total composition, excluding any filler.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials are generally used in amounts of about 0.5 to about 3 parts by weight, based on 100 parts by weight of the total composition, excluding any filler.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides, polyether-polyamide (polyetheramide) block copolymers, polyetheresteramide block copolymers, polyetheresters, or polyurethanes, each containing polyalkylene glycol moieties, polyalkylene oxide units such as polyethylene glycol, polypropylene glycol, polytetramethylene glycol, and the like. Such polymeric antistatic agents are commercially available, such as, for example, Pelestat™ 6321 (Sanyo), Pebax™ H1657 (Atofina), and Irgastat™ P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of about 0.1 to about 3 parts by weight, based on 100 parts by weight of the total composition, excluding any filler.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.1 to about 10 parts by weight, based on 100 parts by weight of the total composition, excluding any filler.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes; thioindigoid dyes; diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes are generally used in amounts of about 0.1 to about 5 parts by weight, based on 100 parts by weight of the total composition, excluding any filler.

Where a foam is desired, a blowing agent may be included in the composition. Suitable blowing agents include for example, low boiling halohydrocarbons; those that generate carbon dioxide; blowing agents that are solid at room temperature and that when heated to temperatures higher than their decomposition temperature generate gases such as nitrogen, carbon dioxide and/or ammonia gas and the like, such as azodicarbonamide, metal salts of azodicarbonamide, 4,4' oxybis(benzenesulfonylhydrazide), sodium bicarbonate, ammonium carbonate, or the like, or combinations comprising at least one of the foregoing blowing agents. Blowing agents are generally used in amounts of about 1 to about 20 parts by weight, based on 100 parts by weight of total composition, excluding any filler.

Anti-drip agents may also be used, for example a fibril forming or non-fibril forming fluoropolymer such as polytetrafluoroethylene (PTFE). The anti-drip agent may be encapsulated by a rigid copolymer as described above, for example SAN. PTFE encapsulated in SAN is known as TSAN. Encapsulated fluoropolymers may be made by polymerizing the encapsulating polymer in the presence of the fluoropolymer, for example, in an aqueous dispersion. TSAN may provide significant advantages over PTFE, in that TSAN may be more readily dispersed in the composition. A suitable TSAN may comprise, for example, about 50 wt. % PTFE and about 50 wt. % SAN, based on the total weight of the encapsulated fluoropolymer. The SAN may comprise, for example, about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents are generally used in amounts of about 0.1 to about 1.4 parts by weight, based on 100 parts by weight of the entire composition.

The thermoplastic compositions may be manufactured by methods generally available in the art, for example, in one embodiment, in one manner of proceeding, powdered polycarbonate resin, polycarbonate-polysiloxane copolymer, polyetherimide, impact modifier and other optional components are first blended, optionally with fillers, in a Henschel™ high speed mixer. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

Thermoplastic compositions as described herein may optionally be free of a glycidyl ester compound such as a glycidyl ester impact modifier, and/or may be free of phosphate-containing flame retardants and/or other phosphate-containing flame compounds, and/or free of polymeric materials based on halogen-substituted aromatic compounds.

In some embodiments, polycarbonate compositions described herein have physical properties that include a melt volume rate (MVR) of about 2.5 to about 20, more specifically about 3 to about 15 cm$^3$/10 minutes, measured at 260° C./2.16 kg in accordance with ASTM D1238-04c (procedure B). The polycarbonate compositions may have a heat deflection temperature (HDT) of about 75 to about 130° C., more specifically about 85 to about 120° C., measured on one-eighth inch (3.2 mm) bars per ASTM D648-04 (method B), at 1.82 MPa. In some embodiments, the polycarbonate compositions have a Notched Izod Impact (NII) of about 150 to about 950 Joules per meter (J/m), or about 250 to about 900 J/m, measured at 23° C. using ⅛-inch bars (3.2 mm) in accordance with ASTM D256-05 (method A). Some embodiments of these polycarbonate compositions have a tensile elongation of about 30% to about 120% or about 40% to about 100% as measured using 3.2 mm thick molded tensile bars tested per ASTM D638-03. The polycarbonate compositions may have flame out time (FOT) at 2 mm of about 0.5 to about 30 seconds, or specifically about 0.5 to about 10 seconds as measured by UL 94 V testing standard. Polycarbonate compositions as described herein may produce a smoke density after 1.5 minutes of flaming or non-flaming test mode (Ds (1.5 minutes) per ASTM E 662-03) of less than or equal to 100, specifically less than or equal to 80 in some embodiments, more specifically less than or equal to 60 in some embodiments. Compositions as described herein may produce a smoke density after 4 minutes burn time under flaming and/or non-flaming test mode (Ds 4 minutes, ASTM E 662-03) of less than 275 or, in some embodiments, less than or equal to 200, specifically less than or equal to 180, more specifically less than or equal to 150 or, still more specifically, less than or equal to 100, in various embodiments.

Shaped, formed, or molded articles comprising the polycarbonate compositions are also provided. In some embodiments, the polycarbonate compositions may be used to form films or sheets, specifically films or sheets with low smoke generation capability. It is common in the art to refer to certain articles synonymously as "films" or "sheets" in many instances, so these terms do not necessarily refer to mutually exclusive embodiments. However, a film may optionally be defined as a layer having a thickness of about 0.1 to about 1000 micrometers, while in general a sheet or other molded article has a thickness of greater than about 1000 micrometers to about 20 millimeters (mm). Such films and sheets are useful to lower smoke generation by themselves, or in combination with a substrate, and can be used in articles for the transportation and construction industry. Such articles include ceilings, sidewalls, bin doors, partitions, window masks, seats, seat back shrouds, seat backs, armrests, tray-tables, storage bins and luggage racks in automobiles such as trains, buses and aircraft.

The films or sheets may be formed by processes such as film and sheet extrusion, injection molding, gas-assist injection molding, extrusion molding, compression molding, blow molding, and combinations comprising at least one of the foregoing processes. Film and sheet extrusion processes may include and are not limited to melt casting, blown film extrusion and calendaring. Co-extrusion and lamination processes may be used to form multi-layer films or sheets. The disclosed films and sheets may alternatively be prepared by casting a solution or suspension of the composition in a suitable solvent onto a substrate, belt or roll, followed by removal of the solvent. Multi-layered articles (also referred to herein as "laminates") comprising at least two layers each comprising a film or sheet may be formed in various ways known in the art. As used herein, the term "laminate" includes, but is not limited to, multi-layer films, multi-layer sheets, and laminated layers of sheets and films. Laminates may be made by any one of a variety of manufacturing methods including but not limited to co-injection molding, co-extrusion lamination, co-extrusion blow film molding, co-extrusion, overmolding, multi-shot injection molding, sheet molding, and the like. Single or multiple layers of coatings may also be applied to the single or multi-layer films, sheets or articles comprising a composition described herein, to impart additional properties such as scratch resistance, ultraviolet light resistance, aesthetic appeal, and the like. Coatings may be applied through standard application techniques such as rolling, spraying, dipping, brushing, flow coating, or combinations comprising at least one of the foregoing application techniques.

Oriented films may be prepared through blown film extrusion or by stretching cast or calendared films in the vicinity of the thermal deformation temperature using standard stretching techniques. For instance, a radial stretching pantograph may be employed for multi-axial simultaneous stretching; an x-y direction stretching pantograph may be used to simultaneously or sequentially stretch in the planar x-y directions. Equipment with sequential uniaxial stretching sections may also be used to achieve uniaxial and biaxial stretching, such as a machine equipped with a section of differential speed rolls for stretching in the machine direction and a tenter frame section for stretching in the transverse direction.

The polycarbonate compositions may also be used to form a multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and where the first side of the plurality of ribs is opposed to the second side of the plurality of ribs.

The films and sheets described above, including multiwall sheets, may be thermoplastically processed into shaped articles via forming and molding processes including but not limited to thermoforming, vacuum forming, pressure forming, injection molding and compression molding.

In other embodiments, the polycarbonate compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones and digital cameras, fixed electrical enclosures such as exit signs, humidifier housings and HVAC (heat ventilation and air conditioning) housings, electrical connectors, and components of lighting fixtures, ornaments, home appliances, roofs, greenhouses, sun rooms, swimming pool enclosures, and the like.

In one embodiment, a laminate may be made by co-extrusion lamination. For example, a laminate 10 as illustrated in FIG. 1 comprises a first layer 2, a second layer 4 and a third layer 6, wherein a first one of layers 2, 4 and 6 comprises a thermoplastic composition as described herein, and a second one of layers 2, 4 and 6 comprises a composition different from the composition of the first layer. Laminate 10 may be prepared by co-extrusion lamination wherein the layers are simultaneously extruded through a sheet or film die orifice that may be of a single manifold or multi-manifold design. While still in the molten state, the layers are laminated together and then compressed together by being passed through the nip of a pair of rolls that may be heated. The laminate is then cooled. The thickness of the laminate 10 is determined by the desired application.

In another embodiment, the laminate 10 is formed by co-extrusion wherein the individual molten layers 2, 4, and 6 are injected together and extruded through a die orifice thereby extruding a multi-layer sheet or film and then cooled.

Yet another embodiment, a process to form the laminate 10 involves the co-extrusion blow film process wherein the layers are extruded to form a tubular parison that is then blow molded into a hollow article that is subsequently slit to prepare a flat laminate 10.

Figure 2:
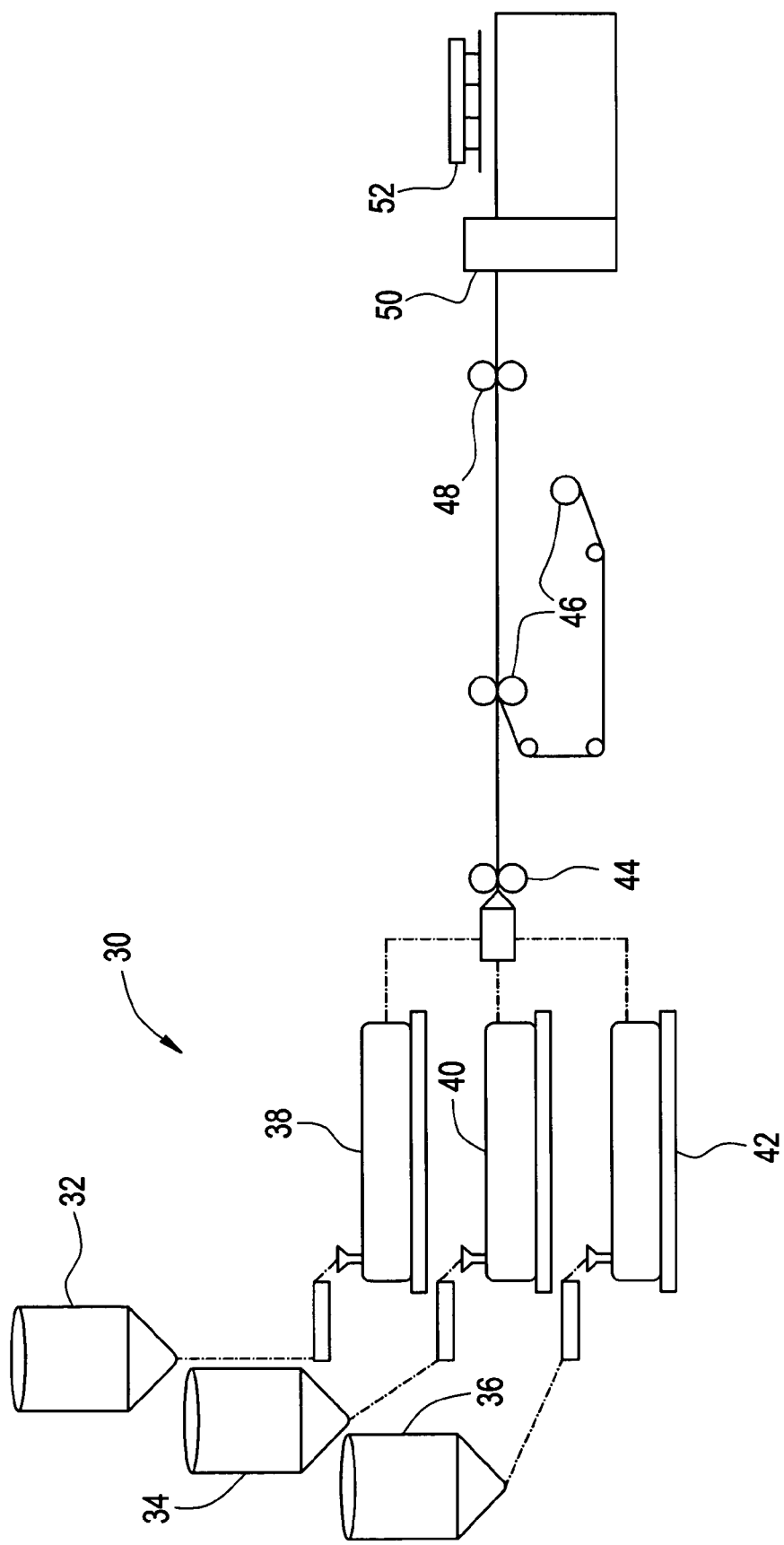
FIG. 2 is a schematic view of one embodiment of a co-extrusion mechanism for forming the laminate the present disclosure.

In one exemplary embodiment illustrated in FIG. 2, the laminate 10 may be formed by an extrusion mechanism 30. Mechanism 30 comprises a first hopper 32, a second hopper 34, and a third hopper 36 for the transfer of material to a corresponding first extruder 38, second extruder 40, and third extruder 42, respectively. The laminate 10 may be formed by co-extrusion lamination of the layers 2, 4, and 6, from hoppers/extruders 32/38, 34/40, and 36/42, respectively. In this manner, each hopper and each extruder may be adapted to process compositions of differing extrusion temperatures and viscosities. First extruder 38, second extruder 40, and third extruder 42 produce layers 2, 4 and 6 (FIG. 1), respectively. Each extruder transfers the molten material for its layer to a roll stack 44 for compression of the separate layers into the laminate 10. The laminate 10 may be further processed onto rolls by a masking roll 46, or pulled into sheets by a pull roll 48. The sheets of laminate 10 may be cut into sheets of smaller dimension at a shear station 50 and placed in a sheet stacker 55.

Figure 3:
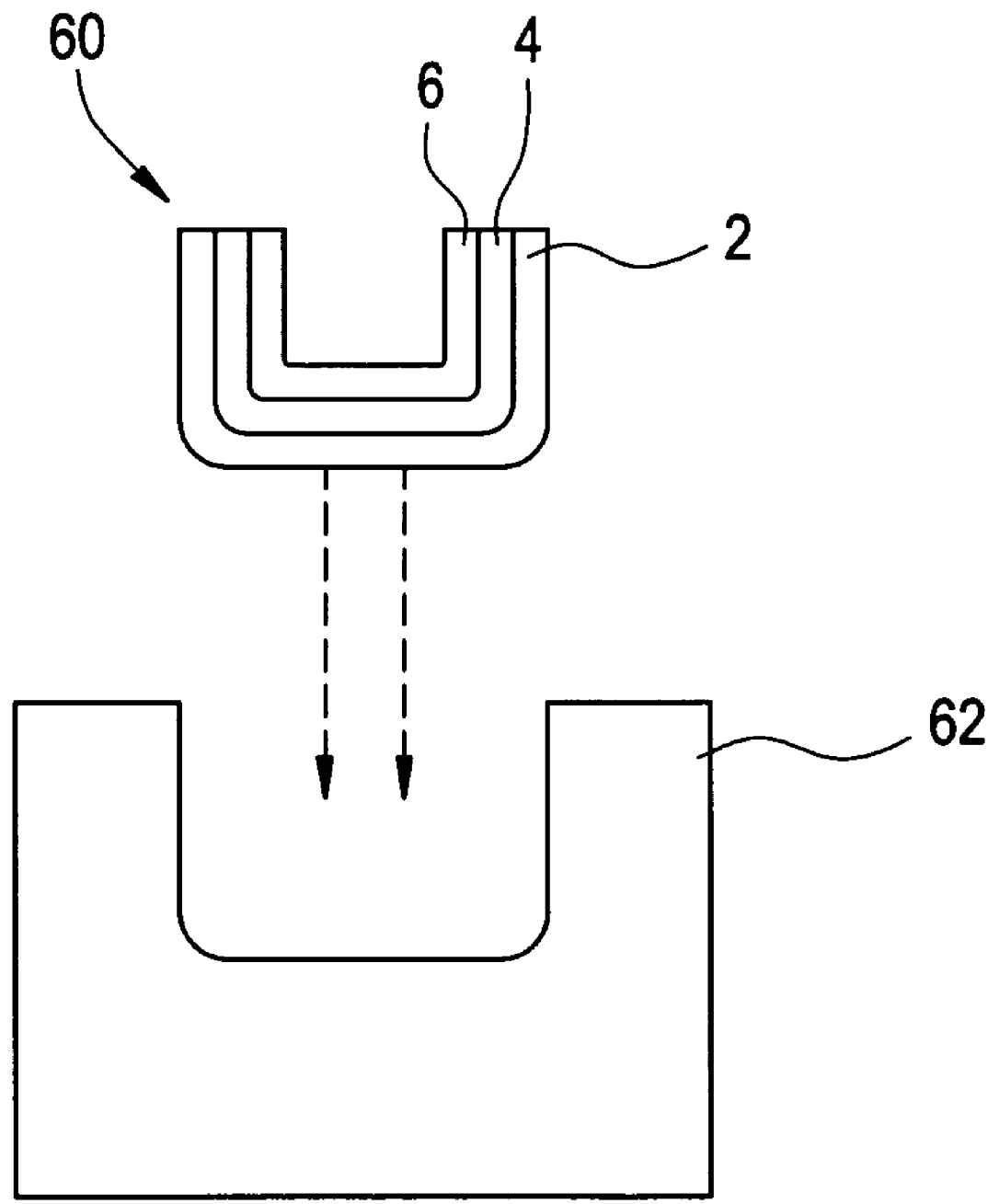
FIG. 3 is a schematic view of one embodiment of a method of making a laminated article.

In an alternative embodiment, the thermoformable laminate 10 may be made into a formed laminate having a desired configuration shown in FIG. 3 as formed laminate 60. The shape of one side of the formed laminate 60 corresponds to the mold 62 as illustrated in FIG. 3. The laminate 10 may be formed into a formed laminate 60 by any one of a variety of methods, including but not limited to, thermoforming, compression forming, vacuum forming and the like.

Figure 4:
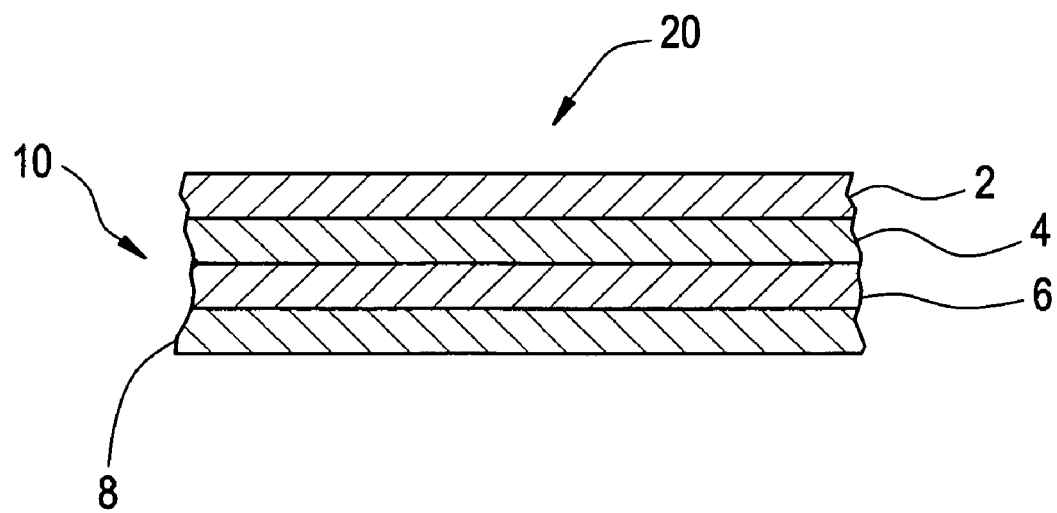
FIG. 4 is a cross-sectional view of one embodiment of a formed article comprising the laminate of FIG. 1 bonded to a substrate.

Optionally, laminate 10 may be applied to a substrate 8 to form a laminated article 20, as shown in FIG. 4. The substrate 8 employed may be any of a variety of suitable compositions including but not limited to thermoset materials, thermoplastic materials, foamed materials, reinforced materials, and combinations thereof. The substrate may also itself comprise a laminate or a multiwalled article or a composite material. Illustrative examples of substrate materials include polyurethane compositions including polyurethane foam and fiber reinforced polyurethane, polypropylene including fiber-reinforced polypropylene, polycarbonate/PBT blends and the like. Reinforcing fibers include carbon fibers, glass and the like. One possible substrate comprises a glass fiber reinforced polycarbonate material such as Rail-lite®, which is commercially available from Azdel, Inc. Inner tie-layer 6 of laminated article 20 is adhered to the substrate 8 while simultaneously providing good adhesion to the middle layer 4 of laminate 10. The bonding of inner tie-layer 6 to substrate 8 may result from molding, adhesives, chemical bonding, mechanical bonding, and the like, as well as combinations thereof. In one exemplary embodiment, the bonding of the inner tie-layer 6 to substrate 8 will result from the injection molding of a substrate 8 directly onto the inner tie-layer 6.

Figure 5:
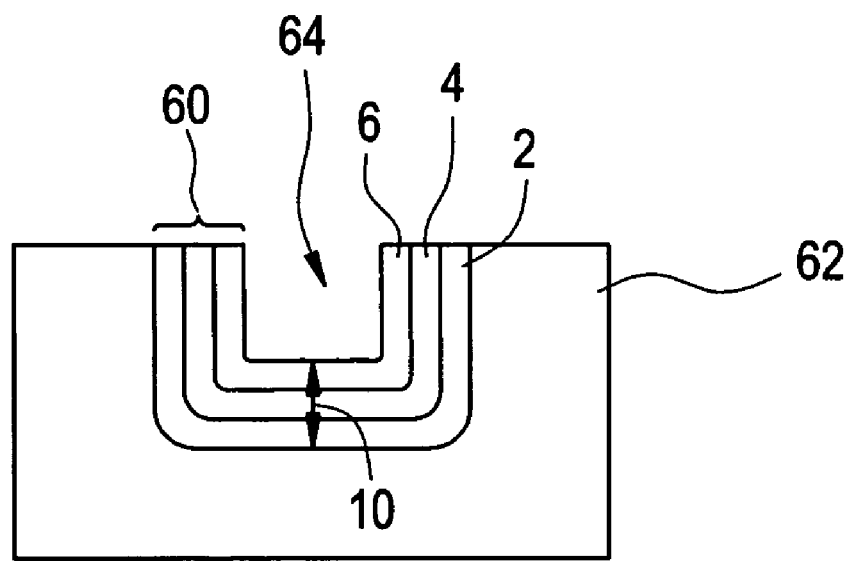
FIG. 5 is a schematic view of a method of making a molded laminated article.
Figure 6:
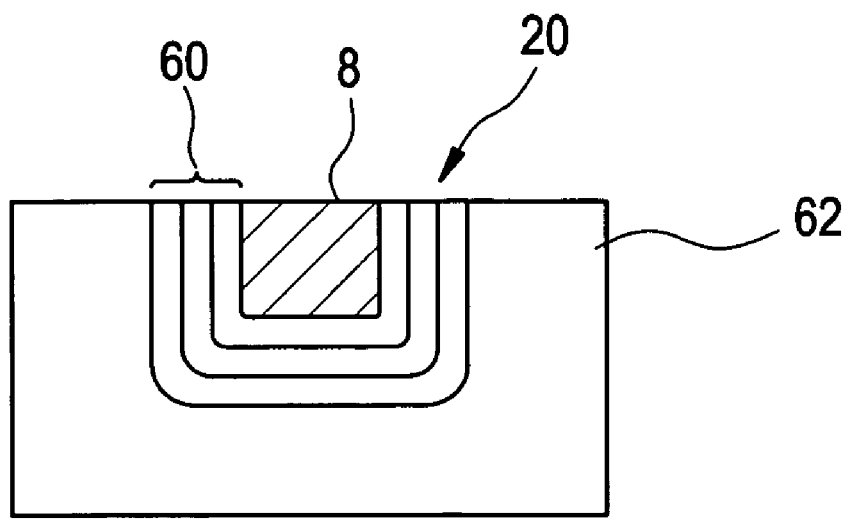
FIG. 6 is a further schematic view of a method of making a molded laminated article.

One method for making laminated article 20 is illustrated in FIGS. 5 and 6. The method comprises providing the laminate 10 as a formed laminate 60; placing the formed laminate 60 into a mold 62 so that a cavity 64 is formed behind or in back of tie-layer 6 of formed laminate 60; and placing a substrate 8 into the cavity 64 behind laminate 10 wherein the inner-tie layer 6 of laminate 10 bonds or is adhered to substrate 8 to provide a laminated article 20. Substrate 8 may be placed into the cavity 64 to be secured to laminate 10 in a variety of ways, including injection molding, reaction injection molding, long fiber reinforced injection molding, and the like. In one embodiment, the substrate 8 is injected into the cavity 64 by reaction injection molding. In one embodiment, the substrate 8 is injected as a liquid and is then molded to form a semi-solid or solid substrate 8.

Optionally, a decorative or protective layer or laminate for laminated article 20 may be applied to the laminate 10 and/or substrate 8, as is known in the art. One such process is described in U.S. Pat. No. 4,609,514 to Kyle et al., dated Sep. 2, 1986.

In various embodiments, a laminate as described herein may be used in the field of transportation, for example, as windowshade material for trains, vehicle headliners, etc.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

In some embodiments, the thermoplastic compositions described herein provide superior heat distortion temperature, flame retardance, chemical resistance, and/or low temperature ductility relative to polycarbonate without the combination of a polyetherimide and polycarbonate-polysiloxane copolymer.

The compositions are further illustrated by the following non-limiting examples, which are based on the following components.

|  |  | Source: |
|---|---|---|
| PC-1 | BPA polycarbonate resin made by an interfacial process with a number average molecular weight of 21,800 Daltons | GE Plastics |
| PC-2 | BPA polycarbonate resin made by an interfacial process with a number average molecular weight of 29,900 Daltons | GE Plastics |
| PC-3 | A branched polycarbonate resin made by an interfacial process with a number average molecular weight of 37,000 Daltons | GE Plastics |
| PC-Si | Polycarbonate-polysiloxane copolymer containing about 20 wt. % siloxane with a polydiorganosiloxane chain length of about 48 and having a number average molecular weight of 29,900 Daltons | GE Plastics |
| BABS | Bulk polymerized ABS comprising 16% rubber and the balance styrene/acrylonitrile | GE Plastics |
| PEI-1 | Polyetherimide made by reaction of bisphenol A dianhydride with about an equal molar amount of m-phenylene diamine having a weight average molecular weight (Mw) of about 33,000 g/mole | GE Plastics, sold as ULTEM ® 1010 |

-continued

| | | Source: |
|---|---|---|
| PEI-2 | Polyetherimide made by reaction of bisphenol A dianhydride with about an equal molar amount of m-phenylene diamine having a weight average molecular weight (Mw) of about 23,000 | GE Plastics, sold as ULTEM ® 1040 |
| PEI-3 | Polyetherimide-siloxane copolymer made from the imidization reaction of m-phenylene diamine, BPA-dianhydride and a bis-aminopropyl functional methyl silicone containing on average about 10 silicone atoms. It has about 34 wt. % siloxane content and a number average molecular weight (Mn) of about 24,000 as measured by gel permeation chromatography. | GE Plastics, sold as SILTEM ® |
| BPA-DP | Bisphenol A bis(diphenylphosphate) | Akzo Nobel |
| RDP | Resorcinol bis(diphenyl phosphate) | Akzo Nobel |

The sample compositions described below were tested for the following characteristics.

Melt volume rate (MVR) was determined at 260° C. using a 2.16-kilogram weight, over 10 minutes, in accordance with ASTM D1238-04c (procedure B).

Heat deformation temperature (HDT) was determined on one-eighth inch (3.2 mm) bars per ASTM D648-04 (method B), at 1.82 MPa. HDT is a relative measure of a material's ability to perform for a short time at elevated temperatures while supporting a load. The test measures the effect of temperature on stiffness: a standard test specimen is given a defined surface stress and the temperature is raised at a uniform rate.

Notched Izod Impact strength (NII) and percent ductility were also determined on one-eighth inch (3.2 mm) bars per ASTM D256-05 (method A), using a 5 foot-pound hammer, at the indicated temperatures. Izod Impact Strength ASTM D 256-05 (method A) (ISO 180) ('NIII') is used to compare the impact resistances of plastic materials.

Percent ductility was determined on one-eighth inch (3.2 mm) bars at room temperature using the impact energy as well as stress whitening of the fracture surface. Generally, stress whitening can indicate ductile failure mode; conversely, lack of stress whitening can indicate brittle failure mode. Ten bars were tested under the NII conditions described above, and percent ductility is expressed as a percentage of impact bars that exhibited ductile failure mode. Ductility tends to decrease with temperature, and the ductile transition temperature is the temperature at which % ductility falls below 50%.

Instrumented Impact (dart impact or multiaxial impact "MAI") Energy is determined per ASTM D3763-02, determined using a 4-inch (10 cm) diameter, 3.2 millimeter (mm) thick disk at a specified temperature, ½-inch (12.7 mm) diameter dart, and an impact velocity of 3.3 meters per second (m/s). Results are reported in Joules.

Tensile modulus and elongation to break were determined using 3.2 mm thick molded tensile bars tested per ASTM D638-03.

Spiral flow testing was performed according to the following procedure. A molding machine with a barrel capacity of 3 to 5 ounces (85 to 140 g) and channel depths of 0.03, 0.06, 0.09, or 0.12 inches (0.76, 1.52, 2.29, or 3.05 millimeters, respectively) is loaded with pelletized thermoplastic composition. The mold and barrel are heated to a temperature suitable to flow the polymer, typically 285 to 330° C. The thermoplastic composition, after melting and temperature equilibration, is injected into the selected channel of the mold at 1500 psi (10.34 MPa) for a minimum flow time of 6 seconds, at a rate of 6.0 inches (15.24 cm) per second, to allow for maximum flow prior to gate freeze. Successive samples are generated using a total molding cycle time of 35 seconds. Samples are retained for measurement either after 10 runs have been completed, or when successively prepared samples are of consistent size. Five samples are then collected and measured to within the nearest 0.25 inches (0.64 cm), and a median length for the five samples is reported. As reported herein, spiral flow was determined at 260° C., 6-second injection, with 2.3 mm wall thickness.

Flammability tests were performed following the procedure of Underwriter's Laboratory Bulletin 94 entitled "Tests for Flammability of Plastic Materials, UL94". Several ratings can be applied based on the rate of burning, time to extinguish, ability to resist dripping, and whether or not drips are burning. According to this procedure, materials may be classified as HB, V0, UL94 V1, V2, 5VA and/or 5VB on the basis of the test results obtained for five samples. The criteria for the flammability classifications or "flame retardance" tested for these compositions are described below.

V0: In a sample placed so that its long axis is 180 degrees to the flame, the average period of flaming and/or smoldering after removing the igniting flame does not exceed five seconds and none of the vertically placed samples produces drips of burning particles that ignite absorbent cotton. Five bar flame out time (FOT) is the sum of the flame out time for five bars, each lit twice for a maximum flame out time of 50 seconds.

V1, V2, FOT: In a sample placed so that its long axis is 180 degrees to the flame, the average period of flaming and/or smoldering after removing the igniting flame does not exceed twenty-five seconds and, for a V1 rating, none of the vertically placed samples produces drips of burning particles that ignite absorbent cotton. The V2 standard is the same as V1, except that drips are permitted. Five bar flame out time (FOT) is the sum of the flame out time for five bars, each lit twice for a maximum flame out time of 250 seconds.

5VB: a flame is applied to a vertically fastened, 5-inch (127 mm) by 0.5-inch (12.7 mm) test bar of a given thickness above a dry, absorbent cotton pad located 12 inches (305 mm) below the bar. The thickness of the test bar is determined using calipers with 0.1 mm accuracy. The flame is a 5-inch (127 mm) flame with an inner blue cone of 1.58 inches (40 mm). The flame is applied to the test bar for 5 seconds so that the tip of the blue cone touches the lower corner of the specimen. The flame is then removed for 5 seconds. Application and removal of the flame is repeated for until the specimen has had five applications of the same flame. After the fifth application of the flame is removed, a timer (T-0) is started and the time that the specimen continues to flame (after-flame time), as well as any time the specimen continues to glow after the after-flame goes out (after-glow time), is measured by stopping T-0 when the after-flame stops, unless there is an after-glow and then T-0 is stopped when the after-glow stops. The combined after-flame and after-glow time must be less than or equal to 60 seconds after five applications of a flame to a test bar, and there may be no drips that ignite the cotton pad. The test is repeated on 5 identical bar specimens. If there is a single specimen of the five that does not comply with the time and/or no-drip requirements then a second set of 5 specimens are tested in the same fashion. All of the specimens in the second set of 5 specimens must comply with the requirements in order for material in the given thickness to achieve the 5VB standard.

The data was also analyzed by calculating the average flame out time, standard deviation of the flame out time and the total number of drips, and by using statistical methods to convert that data to a prediction of the probability of first time pass, or "p(FTP)", that a particular sample formulation would achieve a "pass" rating in the conventional UL94 V0 or V1 testing of 5 bars. The probability of a first time pass on a first submission (p(FTP)) may be determined according to the formula:

$$p(FTP)=(P_{t1>mbt,n=0} \times P_{t2>mbt,n=0} \times P_{total<=mbt} \times P_{drip,n=0})$$

where $P_{t1>mbt,\ n=0}$ is the probability that no first burn time exceeds a maximum burn time value, $P_{t2>mbt,\ n=0}$ is the probability that no second burn time exceeds a maximum burn time value, $P_{total<=mbt}$ is the probability that the sum of the burn times is less than or equal to a maximum total burn time value, and $P_{drip,\ n=0}$ is the probability that no specimen exhibits dripping during the flame test. First and second burn time refer to burn times after a first and second application of the flame, respectively.

The probability that no first burn time exceeds a maximum burn time value, $P_{t1>mbt,\ n=0}$, may be determined from the formula:

$$P_{t1>mbt,n=0}=(1-P_{t1>mbt})^5$$

where $P_{t1>mbt}$ is the area under the log normal distribution curve for t1>mbt, and where the exponent "5" relates to the number of bars tested.

The probability that no second burn time exceeds a maximum burn time value may be determined from the formula:

$$P_{t2>mbt,n=0}=(1-P_{t2>mbt})^5$$

where $P_{t2>mbt}$ is the area under the normal distribution curve for t2>mbt. As above, the mean and standard deviation of the burn time data set are used to calculate the normal distribution curve. For the UL-94 V-0 rating, the maximum burn time is 10 seconds. For a V-1 or V-2 rating the maximum burn time is 30 seconds.

The probability $P_{drip,\ n=0}$ that no specimen exhibits dripping during the flame test is an attribute function, estimated by:

$$(1-P_{drip})^5$$

where $P_{drip}$=(the number of bars that drip/the number of bars tested).

The probability $P_{total<=mbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mbt}$ may be determined from the area under a log normal distribution curve of a set of 1000 Monte Carlo simulated 5-bar total burn time for total<=maximum total burn time. For the UL-94 V0 rating, the maximum total burn time is 50 seconds. For a V1 or V2 rating, the maximum total burn time is 250 seconds.

Preferably, p(FTP) is as close to 1 as possible, for example, greater than or equal to about 0.85, optionally greater than or equal to about 0.9 or, more specifically, greater than or equal to about 0.95, for maximum flame-retardant performance in UL testing. The p(PTP)≧0.85 is a more stringent standard than merely specifying compliance with the referenced V0 or V1 test.

Time to drip (TTD): The time to drip is determined by alternately applying and removing a flame as described for the 5VB test in consecutive 5-second intervals, until the first drip of material falls from the bar. A time to drip characteristic of 55 seconds (s) or greater has been found to correlate well with other desired characteristics such as 5VB ratings.

Smoke density measurements were based on determinations of Specific Optical Density (Ds) measured according to ASTM E 662-03. According to ASTM E 662-03, three square samples of the composition measuring 7.6 centimeter (cm) (3-inch) per side (58 cm², 9 in²) and 3.2 mm (⅛ inch) thick were dried for 24 hours at 60° C. and conditioned to equilibrium at 50% relative humidity at 23° C. The samples are then subjected to flaming combustion (by exposure to radiant heat flux of 25 kW/m² and open flame designed to provide an additional heat flux of about 10 kW/m² for a total of 35 kW/m²) in a closed chamber. Smoke causes the attenuation of a light beam passing through the chamber, which is measured in terms of % light transmittance during the course of combustion. The quantity of smoke at any specific time is expressed as the Specific Optical Density (Ds) according to the following formula:

$$Ds=(V/AL)\log(100/T)=G\log(100/T)=132\log(100/T)$$

Where; V=chamber volume (18 ft³); A=Exposed area of the sample (0.0456 ft²); L=length of light path in chamber (3 ft); T=% transmittance; and G is a geometric factor. As used herein, the term "smoke density" refers to a value of Ds. Smoke density limits specify maximum values for Ds after a selected burn time of the sample, for example, Ds after the sample has burned for 1.5 minutes is designated as Ds (1.5 min) or Ds, 1.5 min. or $Ds_{1.5}$. Smoke density limits for material used in transportation are commonly Ds (1.5 min) of 100 and Ds (4.0 min) of 200 in flaming test mode. Ds(max), the maximum density at any point in the test, may also be reported. The test data and claims refer to Ds obtained from samples that are 3.2 millimeter thick, 7.6 centimeter square.

Sample compositions were prepared by combining the listed components in a melt extrusion process using a Werner & Pfleiderer 25 mm twin screw extruder at a nominal melt temperature of 260° C. to 340° C., 25 inches (635 mm) of mercury vacuum, and 500 rpm. The extrudate was pelletized and dried at about 100° C. for about 4 hours. To make test specimens, the dried pellets were injection molded using a Van Dorn 85-ton injection molding machine at 244° C. to form specimens for heat distortion temperature, notched Izod impact, multiaxial impact, tensile and smoke testing. Bars for flame testing were injection molded at a temperature of 244° C. on a Husky injection molding machine.

EXAMPLE 1

A series of compositions was prepared as set forth in Table 1A-1 and Table 1B, using the materials described above. In addition to the tabulated materials, each sample comprised about 0.5 wt. % TSAN and about 0.46 wt. % other additives (antioxidants, stabilizer and mold release agent). The polycarbonate ("PC") was a combination of equal weights of PC-1 and PC-2. The samples were tested as described above, and the results are set forth in Tables 1A-1, 1A-2 and 1B.

TABLE 1A-1

| Components | Units | C1 | C2 | 1 | 2 | 3 | 4 | 5 |
|---|---|---|---|---|---|---|---|---|
| PC (50 wt. % PC-1 + 50 wt. % PC-2) | wt. % | 69.1 | 76 | 94.04 | 86.04 | 81.04 | 71.04 | 76.04 |
| PC-Si | wt. % | — | — | — | 8 | 8 | 8 | 18 |
| BPADP | wt. % | 12.25 | 10 | — | — | 5 | 5 | — |
| PEI-1 | wt. % | — | — | — | — | — | 10 | — |
| BABS | wt. % | 18 | 13 | 5 | 5 | 5 | 5 | 5 |
| TSAN | wt. % | 0.65 | 1 | 0.5 | 0.5 | 0.5 | 0.5 | 0.5 |
| PHYSICAL PROPERTIES | | | | | | | | |
| NII, 23° C. | J/m | 535 | 587 | 856.7 | 881.5 | 971.2 | 197.6 | 895.3 |
| Ductility, 23° C. | % | 85 | 100 | 100 | 100 | 100 | 0 | 100 |
| NII, 0° C. | J/m | 125 | 150 | 470.5 | 829.0 | 839.8 | 186.4 | 835.8 |
| Ductility, 0° C. | % | 0 | 0 | 40 | 100 | 100 | 0 | 100 |
| Spiral Flow, 260° C. | Cm | 42 | 27 | 16.5 | 17.1 | 22.9 | 18.4 | 17.8 |
| MVR, 260° C., 2.16 kg | cm³/10 min | 19 | 10 | 5.4 | 5.8 | 7.6 | 5.5 | 5.1 |
| HDT | ° C. | 84 | 90 | 121.8 | 121.4 | 104.4 | 104.8 | 120.2 |
| Tensile Modulus | MPa | 2950 | 2900 | 2489.7 | 2269.0 | 2586.2 | 2737.9 | 2193.1 |
| Tensile Elongation | % | 80 | 85 | 121.7 | 126.9 | 115.2 | 75.2 | 114.3 |
| MAI Total Energy | J | 50 | 54 | 77.4 | 71.3 | 71.1 | 66 | 64.1 |

| Components | Units | 6 | 7 | 8 | 10 | 11 | 12 |
|---|---|---|---|---|---|---|---|
| PC (50 wt. % PC-1 + 50 wt. % PC-2) | wt. % | 71.04 | 61.04 | 76.04 | 66.04 | 74.54 | 51.04 |
| PC-Si | wt. % | 18 | 18 | 8 | 18 | 12 | 18 |
| BPADP | wt. % | 5 | 5 | — | — | 2.5 | 5 |
| PEI-1 | wt. % | — | 10 | 10 | 10 | 5 | 20 |
| BABS | wt. % | 5 | 5 | 5 | 5 | 5 | 5 |
| TSAN | wt. % | 0.5 | 0.5 | 0.5 | 0.5 | 0.5 | 0.5 |
| PHYSICAL PROPERTIES | | | | | | | |
| NII, 23° C. | J/m | 986.1 | 583.4 | 757.3 | 724.2 | 832.7 | 101.3 |
| Ductility, 23° C. | % | 100 | 100 | 100 | 100 | 100 | 0 |
| NII, 0° C. | J/m | 905.0 | 444.3 | 663.6 | 649.7 | 743.5 | 95.9 |
| Ductility, 0° C. | % | 100 | 100 | 100 | 100 | 100 | 0 |
| Spiral Flow, 260° C. | Cm | 24.8 | 19.7 | 14.0 | 15.2 | 15.9 | 10.2 |
| MVR, 260° C., 2.16 kg | cm³/10 min | 6.5 | 4.7 | 3.5 | 3.2 | 4.5 | 1.8 |
| HDT | ° C. | 103.3 | 103.6 | 122.8 | 122.6 | 111.5 | 105.1 |
| Tensile Modulus | MPa | 2482.8 | 2600.0 | 2351.7 | 2241.4 | 2441.4 | 2682.8 |
| Tensile Elongation | % | 113.4 | 110.9 | 111.9 | 106.1 | 105.3 | 32.0 |
| MAI Total Energy | J | 63.5 | 54.8 | 68.5 | 62.2 | 66.7 | 47.1 |

TABLE 1A-2

| Properties | Units | C1 | C2 | 1 | 2 | 3 | 4 | 5 |
|---|---|---|---|---|---|---|---|---|
| FLAME PROPERTIES | | | | | | | | |
| UL94 p(FTP) V0 2 mm | | 1 | 1 | 0 | 0 | 0.77 | 1 | 0 |
| UL94 p(FTP) V1 2 mm | | 1 | 1 | 0.05 | 0 | 1 | 1 | 0.65 |
| UL94 p(FTP) V0 1.5 mm | | 0.85 | 0.98 | 0 | 0 | 0 | 0.6 | 0 |
| UL94 p(FTP) V1 1.5 mm | | 1 | 1 | 0 | 0 | 0.88 | 0.99 | 0.05 |
| UL94 5VB FOT 2.5 mm | Secs | 9 | 6 | 7.8 | 30.4 | 27.2 | 7.7 | 33.9 |
| UL94 5VB Drips 2.5 mm | | No | No | Yes | Yes | Yes (3) | No | Yes |
| UL94 5VB TTD 2.5 mm | Secs | 72 | 62 | 39.2 | 49 | 67 | 73 | 57 |
| UL94 5VB FOT 1.5 mm | Secs | 12 | 14 | 11.76 | 14.8 | 9.6 | 27.3 | 27.5 |
| UL94 5VB Drips 1.5 mm | | Yes | Yes | Yes | Yes | Yes | Yes | Yes |
| UL94 5VB TTD 1.5 mm | Secs | 36 | 28 | 38.2 | 34 | 51 | 64 | 43 |
| SMOKE DENSITY MEASUREMENTS | | | | | | | | |
| Ds, 1.5 min | | 172 | 149 | 94 | 100 | 131 | 29 | 108 |
| Ds, 4 min | | 385 | 325 | 202 | 210 | 272 | 155 | 221 |
| Ds, Max | | 426 | 415 | 279 | 290 | 358 | 218 | 299 |

| Properties | Units | 6 | 7 | 8 | 10 | 11 | 12 |
|---|---|---|---|---|---|---|---|
| FLAME PROPERTIES | | | | | | | |
| UL94 p(FTP) V0 2 mm | | 1 | 1 | 0 | 0.05 | 1 | 1 |
| UL94 p(FTP) V1 2 mm | | 1 | 1 | 0.27 | 1 | 1 | 1 |
| UL94 p(FTP) V0 1.5 mm | | 0.92 | 0.94 | 0 | 0 | 0.02 | 1 |
| UL94 p(FTP) V1 1.5 mm | | 1 | 1 | 0.15 | 0.05 | 0.87 | 1 |
| UL94 5VB FOT 2.5 mm | Secs | 5.5 | 1.6 | 35.2 | 41.9 | 10.5 | 3.7 |
| UL94 5VB Drips 2.5 mm | | No | No | Yes | Yes | No | No |

TABLE 1A-2-continued

| | | | | | | | |
|---|---|---|---|---|---|---|---|
| UL94 5VB TTD 2.5 mm | Secs | 96 | 96 | 78 | 67.0 | 82.0 | 72.0 |
| UL94 5VB FOT 1.5 mm | Secs | 26.6 | 10.2 | 20.0 | 41.3 | 32.7 | 15.3 |
| UL94 5VB Drips 1.5 mm | | Yes (3) | No | Yes | Yes | Yes | Yes |
| UL94 5VB TTD 1.5 mm | Secs | 67 | 79 | 47 | 44 | 70 | 53 |
| SMOKE DENSITY MEASUREMENTS | | | | | | | |
| Ds, 1.5 min | | 156 | 14 | 21 | 29 | 55 | 13 |
| Ds, 4 min | | 290 | 111 | 78 | 82 | 145 | 108 |
| Ds, Max | | 386 | 180 | 185 | 212 | 225 | 169 |

TABLE IB

| Components | Units | 13 | 14 | 15 | 16 | 17 | 18 | 19 | 20 | 21 |
|---|---|---|---|---|---|---|---|---|---|---|
| PC (50 wt. % PC-1 + 50 wt. % PC-2) | wt. % | 71.04 | 66.04 | 61.04 | 51.04 | 66.54 | 71.04 | 64.04 | 62.04 | 71.54 |
| PC-Si | wt. % | 15 | 15 | 15 | 15 | 15 | 8 | 15 | 15 | 8.75 |
| BPADP | wt. % | 3 | 3 | 3 | 3 | 7.5 | 5 | 5 | 12 | 7.5 |
| PEI-2 | wt. % | 5 | 5 | 5 | 5 | 5 | 10 | 10 | 5 | — |
| PEI-3 | wt. % | — | — | — | — | — | — | — | — | 6.25 |
| BABS | wt. % | 5 | 10 | 15 | 25 | 5 | 5 | 5 | 5 | 5 |
| TSAN | wt. % | 0.5 | 0.5 | 0.5 | 0.5 | 0.5 | 0.5 | 0.5 | 0.5 | 0.5 |
| PHYSICAL PROPERTIES | | | | | | | | | | |
| NII, 23° C. | J/m | 702.49 | 711.02 | 782.44 | 692.90 | 667.85 | 190.81 | 688.64 | 577.24 | 698.23 |
| Ductility, 23° C. | % | 100 | 100 | 100 | 100 | 100 | 0 | 100 | 100 | 100 |
| Spiral Flow, 260° C. | cm | 20.3 | 21.6 | 23.5 | 27.9 | 27.3 | 22.2 | 22.9 | 30.5 | 28.6 |
| MVR, 260° C., 2.16 kg | cm³/10 min | 4.1 | 6.3 | 8.1 | 10.3 | 8.7 | 6.6 | 6.2 | 10.5 | 8.6 |
| HDT | ° C. | 107.9 | 107.1 | 105.3 | 103.2 | 95.9 | 104.4 | 103.1 | 86.9 | 92 |
| FLAME PROPERTIES | | | | | | | | | | |
| UL94 p(FTP) V0 2 mm | | 1 | 0.9 | 0.6 | 0 | 1 | 1 | 1 | 1 | 1 |
| UL94 p(FTP) V1 2 mm | | 1 | 1 | 0.9 | 0.1 | 1 | 1 | 1 | 1 | 0.9 |
| UL94 p(FTP) V0 1.5 mm | | 0.5 | 0.2 | 0.1 | 0 | 1 | 0.98 | 1 | 1 | 0.5 |
| UL94 p(FTP) V1 1.5 mm | | 0.9 | 0.8 | 0.5 | 0 | 1 | 0.98 | 1 | 1 | 0.78 |
| UL94 5VB FOT 2 mm | secs | 11 | 20 | 21 | 29 | 4 | 7.5 | 6 | 3.2 | 14 |
| UL94 5VB Drips 2 mm | | No | Yes | Yes | Yes | No | No | No | No | Yes |
| UL94 5VB TTD 2 mm | secs | 67 | 52 | 51 | 34 | 80.9 | 85 | 91 | 97 | 51 |
| UL94 5VB FOT 1.5 mm | secs | 14 | 23 | 23 | 40 | 10 | 11.4 | 9 | 7 | 24 |
| UL94 5VB Drips 1.5 mm | | Yes | Yes | Yes | Yes | Yes | Yes | No | No | Yes |
| UL94 5VB TTD 1.5 mm | secs | 49 | 37 | 34 | 18 | 59 | 52 | 64 | 70 | 30 |
| SMOKE DENSITY MEASUREMENTS | | | | | | | | | | |
| Ds, 1.5 min | | 15 | 38 | 78 | 119 | 42 | 22 | 16 | 98 | 48 |
| Ds, 4 min | | 139 | 169 | 187 | 231 | 199 | 142 | 124 | 298 | 280 |
| Ds, Max | | 195 | 239 | 249 | 378 | 261 | 205 | 187 | 334 | 392 |

The data of Tables 1A-1 and 1A-2 shows that although a 95/5 PC/ABS blend with 0.5% TSAN (sample 1) has good room temperature impact resistance and processability (spiral flow), it exhibits poor ductility at low temperature and poor flame retardance (FR) performance, as the sample fails both V0 and 5VB testing at the thickness ranges studied. A comparison of sample 1 with sample 2 and of sample 2 with sample 5 shows that addition of polycarbonate-polysiloxane copolymer improves ductility at lower temperatures (0° C.) but worsens smoke density (Ds) results, while flame retardance performance remains very poor.

A comparison of sample 2 with sample 3 and of sample 5 with sample 6 shows that the addition of 5% of a phosphorous-containing flame retardant (BPADP) provides an improvement in flame retardance performance combined with further worsening of Ds values and reduction in HDT. For example, samples 3 and 6 pass V1 testing at thicknesses of 1.5 mm and 2 mm where samples 2 and 5 do not, but both samples 3 and 6 have high Ds values. These examples show the difficulty in producing a polycarbonate material with good flame retardance performance and low temperature impact resistance that also generates low smoke. Comparing samples 4 and 8 shows that 5 wt. % BPADP can completely defeat ductility unless polycarbonate-polysiloxane copolymer constitutes more than 8 wt. % of the composition, for example, about 12 to about 20 wt. % or, more specifically, about 15 to about 18 wt. %, as seen by comparing sample 4 to sample 10 and samples 12-16. It is noted that the 8 wt. % polycarbonate-polysiloxane copolymer provided about 1.6 wt. % siloxane to the composition, so in the presence of 5 wt. % BPADP, about 2.4 to about 4 wt. % siloxane or, more specifically, about 3 to about 3.6 wt. % siloxane in the composition provides ductility.

The data of Tables 1A-1 and 1A-2 clearly shows a surprising reduction in smoke density can be achieved in polycarbonate compositions that contain polycarbonate-polysiloxane copolymer in combination with the polyetherimide, as seen by comparing sample 2 with sample 8, and sample 5 with sample 10. In addition, samples 5 and 10 show that by including a small amount of polyetherimide, a mainly polycarbonate composition even without a phosphorous-containing flame retardant can pass UL 94 V1 rating at 2 mm thickness.

However, even more surprising are the results from adding polyetherimide to compositions that further include a flame retardant such as BPADP, as evident from comparisons of sample 3 with sample 4 and sample 6 with sample 7. Samples 3 and 4 also show in the presence of flame retardant, a small amount of the polyetherimide can yield significant improvement in flame retardance performance i.e. improved V0 capability in 1.5 mm samples and in 5VB performance at lower thicknesses. In addition, synergistic interaction between the components of the compositions is evident from a comparison of sample 4 with sample 7, because sample 7 has a lower Ds despite having more polycarbonate-polysiloxane copolymer. This is contrary to the trend demonstrated above in samples without polyetherimide (samples 2 and 5), for which adding polycarbonate-polysiloxane copolymer tends to increase (worsen) the Ds rating (also compare sample 3 with sample 6). The data of sample 12 indicates that with greater amounts of polyetherimide, for example, about 20 wt. %, no major improvement in Ds is seen, but there is a loss of impact strength and ductility.

The data shows that polycarbonate compositions can contain polycarbonate-polysiloxane copolymer and, optionally, a flame retardant such as BPADP, attain low temperature ductility and still meet ASTM E 662-03 specifications (which have been widely adopted within the transportation industry), permitting their use in many transportation and other low smoke environments.

The data of Table 1B for samples 13-16 indicate that with 5 wt. % polyetherimide and 15 wt. % polycarbonate-polysiloxane copolymer, increasing the proportion of ABS impact modifier increases smoke density Ds, and that a composition that contains 25 wt. % ABS will produce too much smoke to meet a Ds 4 min. of less than 200 under ASTM E 662-03. Samples 13, 17 and 20 indicate that when the composition contains 15 wt. % polycarbonate-polysiloxane copolymer and the BPADP is 12 wt. % or more, excessive smoke is produced. Comparing samples C1 and C2 confirms that BPADP and ABS exacerbate smoke generation even in the absence polycarbonate-polysiloxane copolymer and polyetherimide.

Comparing sample 18 with sample 19 confirms the synergy observed above with samples 4 and 7.

Sample 21 was prepared with a polyetherimide-polydiorganosiloxane copolymer in which the polydiorganosiloxane comprised 20 wt. % of the copolymer, and the copolymer was employed with polycarbonate-polysiloxane copolymer in an amount that provided the same proportion of polyorganosiloxane component in the composition as was provided solely by the polycarbonate-polysiloxane copolymer of sample 17. Comparison of the data for sample 17 with the data for sample 21 shows that the synergistic smoke-reducing effect of the combination of polyetherimide, polycarbonate and polycarbonate-polysiloxane copolymer was reduced. When present in some embodiments, polyetherimide-polydiorganosiloxane copolymer may be limited to amounts that do not defeat the synergistic smoke-reducing effect of polysiloxane in the polycarbonate-polysiloxane copolymer.

EXAMPLE 2

Several compositions were prepared and tested as described above for Example 1. The contents of the compositions are set forth in Table 2A. In addition to the indicated components, all sample compositions also contained 0.2% Seenox™ stabilizer, 0.3% Irganox™ 1076 antioxidant, and 0.1% Irgaphos™ 168 stabilizer by weight of the sample.

TABLE 2A

| | | Sample Compositions | | | | | |
|---|---|---|---|---|---|---|---|
| Components | Units | 2-1 | 2-2 | 2-3 | 2-4 | 2-5 | 2-6 |
| PC (50 wt. % PC-1 + 50 wt. % PC-2) | wt. % | 78.4 | 76.4 | 73.4 | 76.4 | 74.05 | 67.05 |
| PC-3 | wt. % | | | | 38.2 | 37.03 | 33.53 |
| PC-Si | wt. % | 10 | 10 | 10 | 10 | 10 | 10 |
| BPADP | wt. % | 1 | 3 | 6 | 3 | 3 | 10 |
| PEI-2 | wt. % | 5 | 5 | 5 | 5 | 5 | 5 |
| BABS | wt. % | 5 | 5 | 5 | 5 | 5 | 5 |
| TSAN | wt. % | 0 | 0 | 0 | 0 | 0.35 | 0.35 |
| TiO$_2$ | wt. % | — | — | — | — | 2 | 2 |

The test results for the compositions of Table 2A are set forth in Table 2B.

TABLE 2B

| | | Sample Composition | | | | | |
|---|---|---|---|---|---|---|---|
| PHYSICAL PROPERTIES | units | 2-1 | 2-2 | 2-3 | 2-4 | 2-5 | 2-6 |
| NII, 23° C. | J/m | 757.9 | 752.6 | 657.2 | 779.1 | 805.6 | 183.0 |
| Ductility, 23° C. | % | 100 | 100 | 100 | 100 | 100 | 20 |
| MVR, 260° C., 5 kg | cm$^3$/10 min | 10.95 | 13.6 | 19.37 | 6.65 | 7.18 | 15.06 |
| HDT | ° C. | 117.4 | 110.4 | 101.5 | 111.5 | 110.7 | 91.4 |
| Tensile Modulus | MPa | 2440 | 2585 | 2770 | 2630 | 2525 | 2925 |
| Tensile Elongation | % | 120 | 120 | 107 | 95 | 110 | 100 |
| FLAME PROPERTIES | | | | | | | |
| UL94 p(FTP) V0 2 mm | | 0 | 0.5 | 0.94 | 0.56 | 0.86 | 1 |
| UL94 p(FTP) V1 2 mm | | 0.5 | 0.89 | 1 | 1 | 1 | 1 |
| UL94 p(FTP) V0 1.5 mm | | 0 | 0 | 0.1 | 0 | 0.48 | 1 |
| UL94 p(FTP) V1 1.5 mm | | 0 | 0 | 0.79 | 0.2 | 0.85 | 1 |
| UL94 5VB FOT 2 mm | secs | 12 | 11 | 8 | 7.5 | 6 | 2.8 |
| UL94 5VB Drips 2 mm | | Yes | Yes | Yes | Yes | No | No |
| UL94 5VB TTD 2 mm | secs | 39 | 42.1 | 44 | 53 | 75 | 91 |
| UL94 5VB FOT 1.5 mm | secs | 16 | 12 | 10 | 8 | 10 | 4 |
| UL94 5VB Drips 1.5 mm | | Yes | Yes | Yes | Yes | Yes | No |
| UL94 5VB TTD 1.5 mm | secs | 20 | 22 | 25 | 38 | 51 | 68 |
| SMOKE DENSITY MEASUREMENTS | | | | | | | |
| Ds, 1.4 min | | 15 | 21 | 38 | 24 | 32 | 72 |
| Ds, 4 min | | 124 | 146 | 195 | 148 | 164 | 285 |

A review of the data for samples 2-1, 2-2, and 2-3 shows, as does the data of Example 1, that increasing BPADP causes an increase in smoke density. This trend is also seen by comparing sample 2-5 with 2-6. However, samples 2-3 and 2-6 have better flame ratings than samples with less BPADP.

The thermoplastic polycarbonate compositions described herein can be used to make films, sheets, laminates and other articles that have the same or substantially similar smoke density properties, HDT, impact strengths, ductility, tensile properties, UL94 properties, etc., as the compositions themselves.

The formulations in Table 2A were extruded into films with thickness of 30 mils, 25 mils, 20 mils, 16 mils, 12 mils, 10 mils and 8 mils (0.076 millimeter (mm), 0.635 mm, 0.5 mm, 0.41 mm, 0.305 mm, 0.254 mm, and 0.2 mm) using a Randcastle laboratory coextrusion film line, with a 6 inch (15.24 centimeter (cm) die, feedblock capable of running ABCBA structures, and 3 vertical extruders having diameters of 5/8 inch, 5/8 inch, and 1 inch (1.59 cm, 1.59 cm and 2.54 cm). This setup is similar to schematic shown in FIG. 2. The molten web is deposited horizontally into a nip formed by 2 heated steel rolls. Final film thickness is controlled primarily by extruder RPM, roll gap, and pull speed. The same material was used in all three extruders with the following profile: Zone 1 temperature of 540° F. (about 282° C.), Zone 2 temperature of 545° F. (about 285° C.) and Zone 3 temperature of 550° F. (about 288° C.). The transfer block was set at 535° F. (about 279° C.). The melt temperature was around 555° F. (about 290.5° C.) while the melt pressure was around 2500 psi (17.2 MPa) with a screw speed of 20-35 RPM. The heated rolls were set at 250° F. (about 121° C.). These films can be used for smoke testing by themselves or in combination with other substrates following one of the laminate processing procedures described earlier in the application. These formulations were found to exhibit enhanced extrudability relative to those in Tables 1-A and 1-B, due to having higher melt strengths. A higher melt strength allows for uniform films to be extruded with lower wall thickness.

The singular forms "a," "an," and "the" include plural referents unless the context clearly dictates otherwise. The endpoints of all ranges reciting the same characteristic are independently combinable and inclusive of the recited endpoint. All references are incorporated herein by reference.

The modifier "about" used in connection with a quantity is inclusive of the stated value and has the meaning dictated by the context (e.g., includes the degree of error associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

What is claimed is:

1. A laminate comprising:
    a first layer; and
    a second layer;
    wherein the first layer comprises a first thermoplastic composition comprising a polycarbonate;
    a polycarbonate-polysiloxane copolymer;
    an impact modifier; and
    a polyetherimide;
    wherein the polycarbonate comprises greater than or equal to about 50% by weight of the combined weights of the polycarbonate, polycarbonate-polysiloxane copolymer, impact modifier and polyetherimide in the first thermoplastic composition;
    wherein a 3.2 millimeter thick, 7.6 centimeter square sample of the first thermoplastic composition produces a smoke density (Ds) of less than 275 after a 4-minute burn, measured according to ASTM L 662-03; and
    wherein a 3.2-mm thick molded NII bar comprising the first thermoplastic composition has a notched Izod impact strength of greater than or equal to about 150 J/m, determined in accordance with ASTM D256-05 (method A) at 23° C., wherein the second layer comprises a second composition different from the composition of the first thermoplastic composition.

2. The laminate of claim 1, wherein a 3.2 millimeter thick, 7.6 centimeter square sample of the layer comprising the first thermoplastic composition produces a smoke density (Ds) of less than 200 after a 4 minute burn, measured according to ASTM E 662-03.

3. The laminate of claim 1, wherein a 3.2 millimeter thick, 7.6 centimeter square sample of the layer comprising the first thermoplastic composition produces a smoke density (Ds) of less than 200 after a 4 minute burn and produces a smoke density (Ds) of less than 100 after a 1.5 minute burn, measured according to ASTM L 662-03.

4. An article comprising the laminate of claim 1 wherein the article is produced by molding the laminate into a shaped article.

5. The laminate of claim 1, wherein a 3.2-mm thick molded NII bar comprising the first thermoplastic composition has a notched Izod impact strength of greater than or equal to about 150 J/m, determined in accordance with ASTM D256-05 (method A) at 0° C.

6. The laminate of claim 1, wherein the first thermoplastic composition has a melt volume rate (MVR) of about 2.5 $cm^3$/10 minutes to about 20 $cm^3$/10 minutes, measured at 260° C./2.16 kg in accordance with ASTM D1238-04c (procedure B).

7. The laminate of claim 1, wherein a flat, 3.2 mm thick molded tensile bar formed from the first thermoplastic composition has a Heat Deflection Test (HDT) temperature of greater than 100° C., determined at 1.82 MPa per ASTM D648-04 (method B).

8. The laminate of claim 1 wherein the first thermoplastic composition comprises a phosphorus-containing flame retardant.

9. The laminate of claim 8, wherein samples of the first thermoplastic composition configured for testing according to UL94 and having a thickness of 2 millimeters achieve at least a UL94 V1 rating.

10. The laminate of claim 8, wherein samples of the first thermoplastic composition configured for testing according to UL94 and having a thickness of 2 millimeters achieve at least a UL94 V1 rating with a p(FTP)≧0.85.

11. The laminate of claim 8 wherein samples of the first thermoplastic composition configured for testing according to UL94 5VB and having a thickness of at least 1.5 mm, when subjected to an open flame for 5 second intervals spaced 5 seconds apart, do not drip for at least 55 seconds.

12. The laminate of claim 1 wherein the first thermoplastic composition comprises about 0.5 wt. % to about 10 wt. % phosphorus-containing flame retardant and polycarbonate-polysiloxane copolymer that provides about 2.4 wt. % to about 4 wt. % siloxane, by weight of the combined weights of the polycarbonate, polycarbonate-polysiloxane copolymer, impact modifier, polyetherimide and flame retardant.

13. The laminate of claim 12 wherein the first thermoplastic composition comprises about 0.5 wt. % to about 5 wt. % phosphorus-containing flame retardant and polycarbonate-polysiloxane copolymer that provides about 2.4 wt, % to about 3.5 wt. % siloxane, by weight of the combined weights of the polycarbonate, polycarbonate-polysiloxane copolymer, impact modifier, polyetherimide and flame retardant.

14. The laminate of claim 1, wherein the first thermoplastic composition further comprises a polyetherimide-polysiloxane copolymer.

15. A laminate comprising:
a first layer; and
a second layer;
wherein the first layer comprises a first thermoplastic composition comprising about 50 wt. % to about 97 wt. % polycarbonate;
about 0.5 wt. % to about 25 wt. % polycarbonate-polysiloxane copolymer;
about 0.5 wt. % to about 20 wt. % impact modifier; and
about 2 wt. % to about 15 wt. % polyetherimide, by weight of the first thermoplastic composition wherein a 3.2-mm thick molded NII bar comprising the first thermoplastic composition has a notched Izod impact strength of greater than or equal to about 150 J/m, determined in accordance with ASTM D256-05 (method A) at 23° C. and wherein the second layer comprises a second composition different from the composition of the first thermoplastic composition.

16. The laminate of claim 15, wherein the first thermoplastic composition comprises about 0.5 wt. % to about 10 wt, % phosphorous-containing flame retardant, by weight.

17. A method for forming a laminate, comprising co-injecting molding, co-extrusion lamination, co-extrusion blow film molding, co-extrusion, overmolding, multi-shot injection molding, or sheet molding a plurality of layers comprising a first layer that comprises a first thermoplastic composition and a second layer that comprises a second thermoplastic composition, the first layer comprising:
a polycarbonate;
a polycarbonate-polysiloxane copolymer;
an impact modifier; and
a polyetherimide;
wherein the polycarbonate comprises greater than or equal to about 50% by weight of the combined weights of the polycarbonate, polycarbonate-polysiloxane copolymer, impact modifier and polyetherimide in the first thermoplastic composition;
wherein a 3.2 millimeter thick, 7.6 centimeter square sample of the first thermoplastic composition produces a smoke density (Ds) of less than 275 after a 4-minute burn, measured according to ASTM L 662-03; wherein a 3.2-mm thick molded NII bar comprising the first thermoplastic composition has a notched Izod impact strength of greater than or equal to about 150 J/m, determined in accordance with ASTM D256-05 (method A) at 23° C.; and wherein the second thermoplastic composition comprises polycarbonate, polyester, polycarbonate-polyester, polyimide, polyetherimide, polysiloxane, polyetherimide-siloxane, polyimide-polysiloxane, polyimide-polyester, polyetherimide-polyester, polyimide-polycarbonate, polyetherimide-polycarbonate, polyimide-polyacrylate, polyetherimide-polyacrylate, polyimide-fluoropolymer, polyetherimide-fluoropolymer, fiber reinforced polymer, polyurethane foam, fiber reinforced polyurethane, polypropylene, and fiber reinforced polypropylene.

* * * * *